United States Patent
Bunte et al.

[19]

[11] Patent Number: 5,873,070
[45] Date of Patent: Feb. 16, 1999

[54] DATA COLLECTION SYSTEM

[75] Inventors: Alan G. Bunte, Cedar Rapids, Iowa;
George E. Hanson, Andover, Kans.;
Dennis Silva, San Jose, Calif.; Steven E. Koenck, Cedar Rapids, Iowa; Paul Beard, Milpitas, Calif.; Darald R. Schultz; Steven H. Salvay, both of Cedar Rapids, Iowa

[73] Assignee: Norand Corporation, Cedar Rapids, Iowa

[21] Appl. No.: 538,430

[22] Filed: Oct. 2, 1995

Related U.S. Application Data

[63] Continuation-in-part of Ser. No. 481,688, Jun. 7, 1995, abandoned.

[51] Int. Cl.⁶ .............................. G06F 17/60; G06F 3/18
[52] U.S. Cl. ........................... 705/28; 235/385; 235/454; 345/7; 345/8; 364/400; 364/709.1; 364/709.11; 364/710.01; 395/2.6
[58] Field of Search ..................... 235/385, 454, 235/462, 472; 345/7, 8; 364/188, 400, 709.1, 709.11, 710.01; 395/2.55, 2.6, 228

[56] References Cited

U.S. PATENT DOCUMENTS

| | | | |
|---|---|---|---|
| 3,426,326 | 2/1969 | Goldstein | 235/385 X |
| 4,101,072 | 7/1978 | Weaver et al. | 235/455 |
| 4,251,798 | 2/1981 | Swartz et al. | 235/462 X |
| 4,345,147 | 8/1982 | Aaron et al. | 235/385 |
| 4,377,741 | 3/1983 | Brekka et al. | 235/472 |
| 4,387,297 | 6/1983 | Swartz et al. | 235/462 |
| 4,458,238 | 7/1984 | Learn | 340/365 R |
| 4,496,831 | 1/1985 | Swartz et al. | 235/472 |
| 4,603,262 | 7/1986 | Eastman et al . | 250/566 |
| 4,758,717 | 7/1988 | Shepard et al. | 235/472 |
| 4,766,299 | 8/1988 | Tierney et al. | 235/472 |
| 4,897,532 | 1/1990 | Swartz et al. | 235/467 |
| 5,052,020 | 9/1991 | Koenck et al. | 375/302 |
| 5,070,536 | 12/1991 | Mahany et al. | 455/67.4 |
| 5,130,520 | 7/1992 | Shepard et al. | 235/472 |
| 5,134,521 | 7/1992 | Lacroix et al. | 359/631 |
| 5,208,449 | 5/1993 | Eastman et al. | 235/462 |
| 5,218,187 | 6/1993 | Koenck et al. | 235/472 |
| 5,218,188 | 6/1993 | Hanson | 235/375 |
| 5,295,154 | 3/1994 | Meier et al. | 375/200 |
| 5,305,181 | 4/1994 | Schultz | 361/680 |
| 5,305,244 | 4/1994 | Newman et al. | 364/708.1 |

(List continued on next page.)

FOREIGN PATENT DOCUMENTS

| | | |
|---|---|---|
| WO 91/11065 | 1/1990 | European Pat. Off. . |
| WO 92/02084 | 7/1990 | European Pat. Off. . |
| WO 93/07691 | 10/1991 | European Pat. Off. . |
| WO 92/15073 | 2/1992 | European Pat. Off. . |
| WO 93/25955 | 6/1992 | European Pat. Off. . |
| WO 94/10774 | 11/1992 | European Pat. Off. . |
| WO 94/15413 | 12/1992 | European Pat. Off. . |
| WO 94/19736 | 2/1993 | European Pat. Off. . |
| WO 94/26038 | 4/1993 | European Pat. Off. . |
| WO 94/27382 | 5/1993 | European Pat. Off. . |

OTHER PUBLICATIONS

Rockwell International, "Look Past Today with Trekker™", pp. 1–4, Mobile Information Systems.

*Primary Examiner*—Edward R. Cosimano
*Attorney, Agent, or Firm*—Suiter & Associates PC

[57] ABSTRACT

An improved data collection system utilizing at least partially integrated data collection and gathering devices and related peripherals. The system includes an at least partially wearable data collection terminal, associated peripherals, and a communication system. The data collection system may utilize a wearable data collection terminal having a computer processor, associated memory, inputs, and outputs. Associated peripheral devices may include voice inputs and outputs, an optically readable information set reader, a keyboard and/or touch-panel, intelligent-body-conforming battery packs, mass storage devices, user position and next task location device, a display, a printer, and a data communication system for both local area and wide area communication.

20 Claims, 28 Drawing Sheets

U.S. PATENT DOCUMENTS

| | | | |
|---|---|---|---|
| 5,322,991 | 6/1994 | Hanson | 235/472 |
| 5,335,170 | 8/1994 | Petteruti et al. | 235/472 X |
| 5,349,678 | 9/1994 | Morris et al. | 395/800 |
| 5,365,546 | 11/1994 | Koenck et al. | 375/223 |
| 5,378,883 | 1/1995 | Batterman et al. | 235/472 |
| 5,394,436 | 2/1995 | Meier et al. | 375/202 |
| 5,416,730 | 5/1995 | Lookofsky | 364/708.1 |
| 5,610,387 | 3/1997 | Bard et al. | 235/472 |

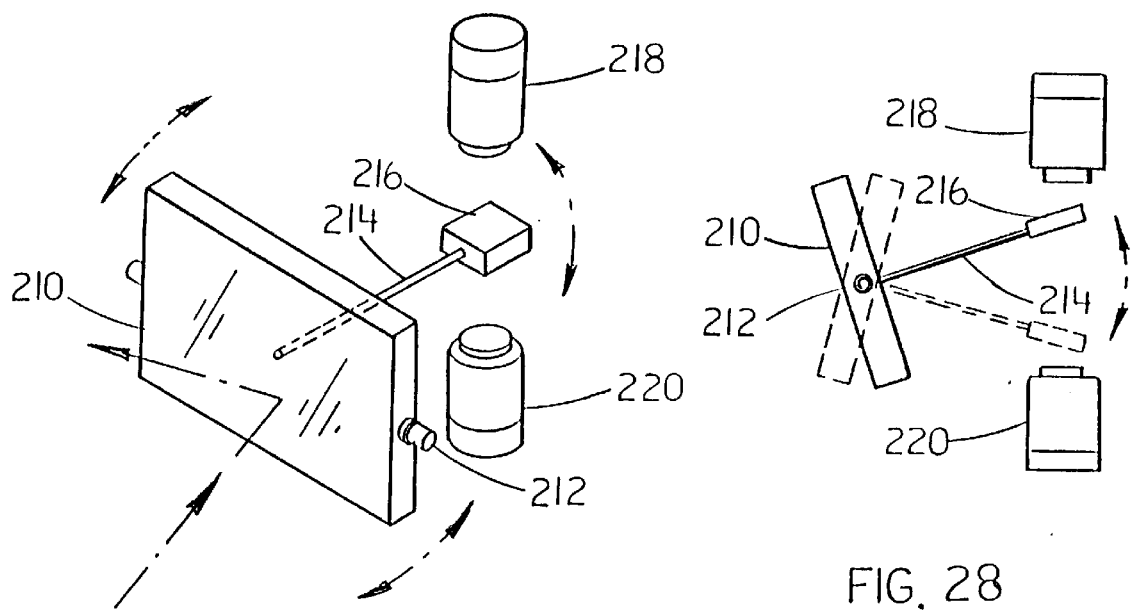
FIG. 27
FIG. 28
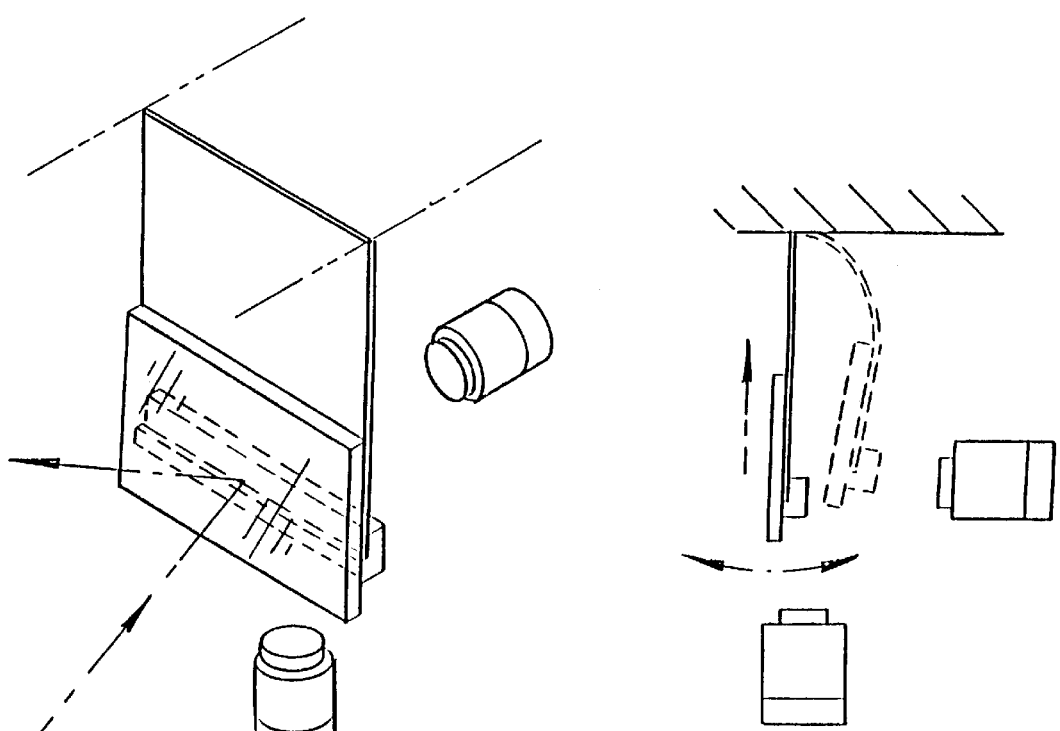
FIG. 29
FIG. 30

DATA COLLECTION SYSTEM

CROSS REFERENCE TO RELATED APPLICATIONS

The present application is a continuation-in-part of U.S. application Ser. No.: 08/481,688 (Attorney Docket No: 38181) filed Jun. 7, 1995 (abandoned).

The present application hereby incorporates by reference, in their entirety, all co-owned issued United States Patents and all co-owned published patent applications, where said applications are properly incorporated herein by reference.

More particularly, the present invention may utilize the communication method and apparatus in any of at least two communication modes of U.S. Pat. No. 5,218,188 issued Jun. 8, 1993 and of U.S. Pat. No. 5,322,991 issued Jun. 21, 1994, both patents assigned to the assignee of the present application. Said U.S. Pat. Nos. 5,218,188 and 5,322,991 are hereby incorporated herein by reference each in its entirety.

The present invention may utilize the method and apparatus for controlling modulation of digital signals in frequency-modulated transmissions of U.S. Pat. No. 5,052,020 issued Sep. 24, 1991 and U.S. Pat. No. 5,365,546 issued Nov. 15, 1994, both patents assigned to the assignee of the present application. Said U.S. Pat. Nos. 5,052,020 and 5,365,546 are hereby incorporated herein by reference each in its entirety.

The present invention may be utilized in an RF terminal in a multi-hop data communication system of a radio frequency local area network as disclosed in U.S. Pat. No. 5,295,154 issued Mar. 15, 1994 and in an RF terminal in an RF multi-hop data communications network as disclosed in U.S. Pat. No. 5,394,436 issued Feb. 28, 1995, both patents assigned to the assignee of the present application. Said U.S. Pat. Nos. 5,295,154 and 5,394,436 are hereby incorporated herein by reference each in its entirety.

The present invention may be utilized in a client data collection terminal of a versatile RF data capture system as disclosed in U.S. Pat. No. 5,349,678 issued Sep. 20, 1994 and assigned to the assignee of the present application. Said U.S. Pat. No. 5,349,678 is hereby incorporated herein by reference in its entirety.

The present invention may be utilized as a mobile transceiver of a mobile radio data communication system and method as disclosed in U.S. Pat. No. 5,070,536 issued Dec. 3, 1991 and assigned to the assignee of the present application. Said application 5,070,536 is hereby incorporated herein by reference in its entirety.

The present invention may be utilized in a multi-level radio frequency communication system as disclosed in WO 92/02084 having a priority date of Jul. 25, 1990 and assigned to the assignee of the present application. Said WO 92/02084 is hereby incorporated herein by reference in its entirety.

The present invention may be utilized in a power conserving modular portable data processor as disclosed in WO 93/25955 having a priority date of Jun. 12, 1992 and assigned to the assignee of the present application. Said WO 93/25955 is hereby incorporated herein by reference in its entirety.

The present invention may be utilized in a hand-held data capture system with interchangeable modules and interactive control circuit as disclosed in WO 92/15073 having a priority date of Feb. 25, 1992 and assigned to the assignee of the present application. Said WO 92/15073 is hereby incorporated herein by reference in its entirety.

The present invention may be utilized in conjunction with an apparatus for controlling modulation of digital signals in frequency-modulated transmissions as disclosed in WO 91/11065 having a priority date of Jan. 18, 1990 and assigned to the assignee of the present application. Said WO 91/11065 is hereby incorporated herein by reference in its entirety.

The present invention may be utilized in a radio frequency communication network having adaptive communication parameters as disclosed in WO 94/10774 having a priority date of Nov. 2, 1992 and assigned to the assignee of the present application. Said WO 94/10774 is hereby incorporated herein by reference in its entirety.

The present invention may be utilized in a portable work station and data collection terminal as disclosed in WO 94/19736 having a priority date of Feb. 26, 1993 and assigned to the assignee of the present application. Said WO 94/19736 is hereby incorporated herein by reference in its entirety.

The present invention may be utilized in a radio frequency local area network as disclosed in WO 93/07691 having a priority date of Oct. 1, 1991 and assigned to the assignee of the present application. Said WO 93/07691 is hereby incorporated herein by reference in its entirety.

The present invention may be utilized in a wireless personal local area network as disclosed in WO 94/15413 having a priority date of Dec. 23, 1992 and assigned to the assignee of the present application. Said WO 94/15413 is hereby incorporated herein by reference in its entirety.

The present invention may be utilized in a premises, peripheral and vehicular local area network system as disclosed in WO 94/27382 having a priority date of May 11, 1993 and assigned to the assignee of the present application. Said WO 94/27382 is hereby incorporated herein by reference in its entirety.

The present invention may be utilized in a multiple antenna selection and antenna cap for computer devices utilizing radio and modem card as disclosed in WO 94/26038 having a priority date of Apr. 27, 1993 and assigned to the assignee of the present application. Said WO 94/26038 is hereby incorporated herein by reference in its entirety.

The present invention may be utilized with the arm or wrist mounted terminal with flexible housing as disclosed in U.S. Pat. No. 5,305,181. Said patent assigned to the assignee of the present application. Said U.S. Pat. No. 5,305,181 is hereby incorporated herein by reference in its entirety.

TECHNICAL FIELD

This invention relates generally to data collection devices and related peripherals and more particularly to an improved data collection system utilizing at least partially integrated data collection-gathering-processing devices and related peripherals.

BACKGROUND ART

Data collection devices are known to the art. Devices such as hand-held data terminals are currently utilized in several industries to collect business related information for both batch and real-time processing. Also known to the art are various methods and apparatus utilized to share information between terminals and their related peripherals.

DISCLOSURE OF THE INVENTION

The present invention discloses an improved data collection system utilizing at least partially integrated data collection and gathering devices and related peripherals. The system includes an at least partially wearable data collection terminal, associated peripherals, and a communication system.

The data collection system of the present system may utilizes, for example, a wearable data collection terminal having a computer processor, associated memory, inputs, and outputs. Associated peripheral devices may include voice inputs and outputs, an optically readable information set reader, a keyboard and/or touch-panel, intelligent-body-conforming battery packs, mass storage devices, a user position and next task location device, a display, a printer, and data communication system for both local area and wide area communication.

BRIEF DESCRIPTION OF THE DRAWINGS

FIGS. 27 and 28 are diagrammatic illustrations of a laser beam redirection mechanism for use with a laser display or scanner according to the system of the present invention;

FIGS. 29 and 30 are diagrammatic illustrations of a piezo electric film motor (two axis) for use with a laser display or scanner according to the system of the present invention.

BEST MODE FOR CARRYING OUT THE INVENTION

Figure 1:
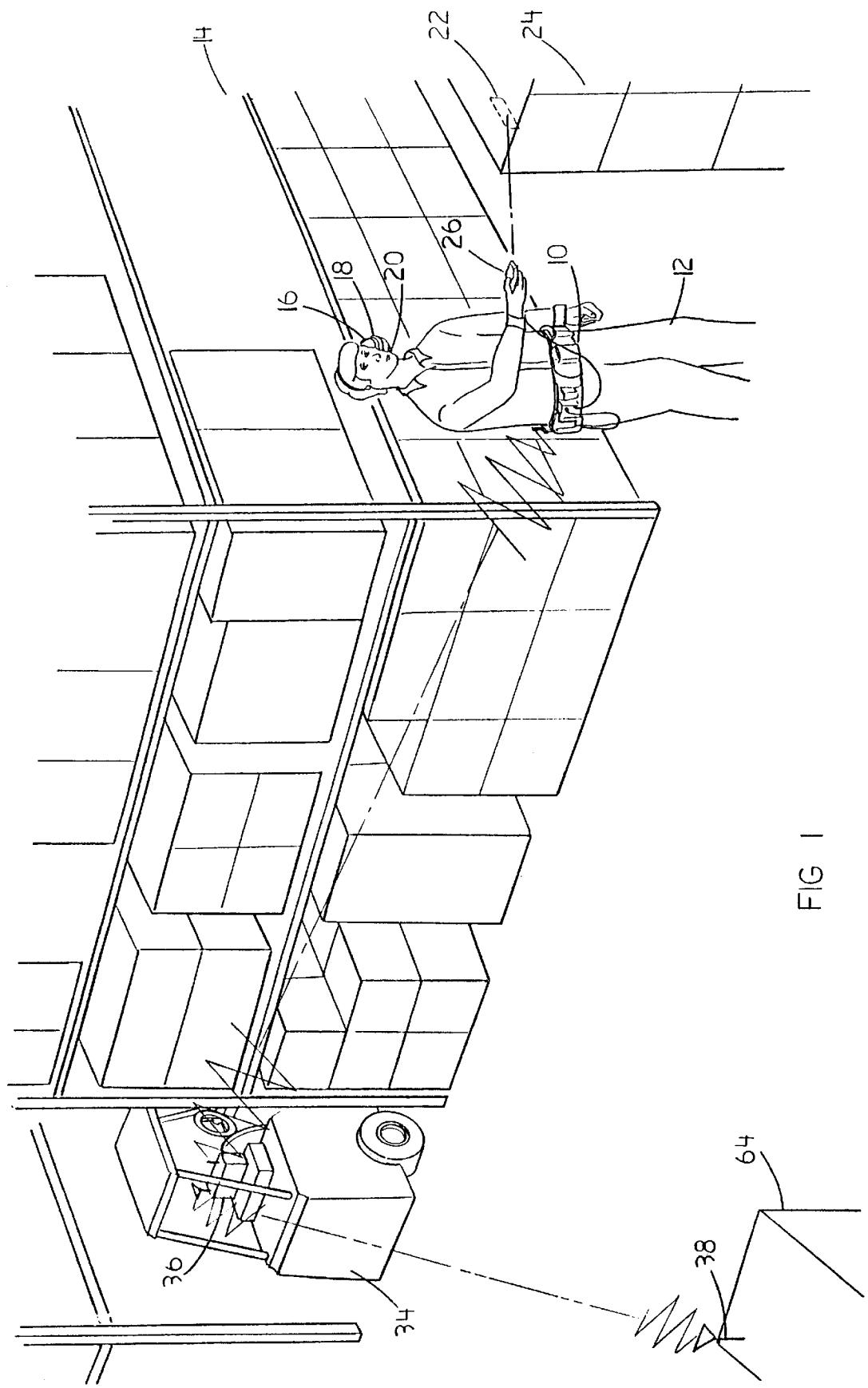
FIG. 1 is a perspective view of a local area network communication system of the present invention which includes a user worn data collection terminal of the type illustrated in FIG. 2 with a vehicle mounted host (user position and next task location device) operably connected through an RF link to a base station host computer for multiuser data collection and processing on a wide area network.
Figure 2:
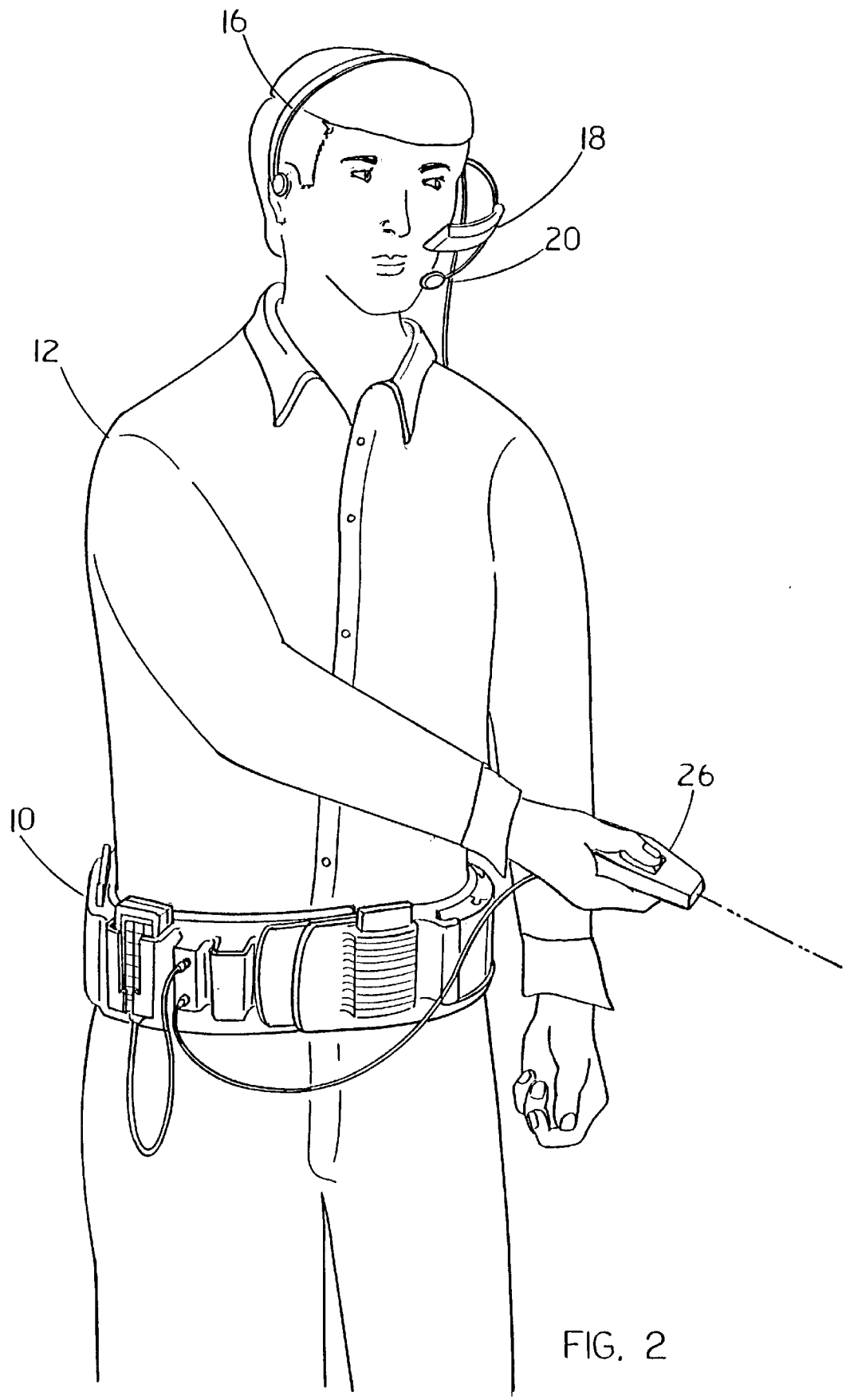
FIG. 2 is a perspective view illustrating a user worn wearable data collection terminal with associated headset and peripheral devices.
Figure 8:
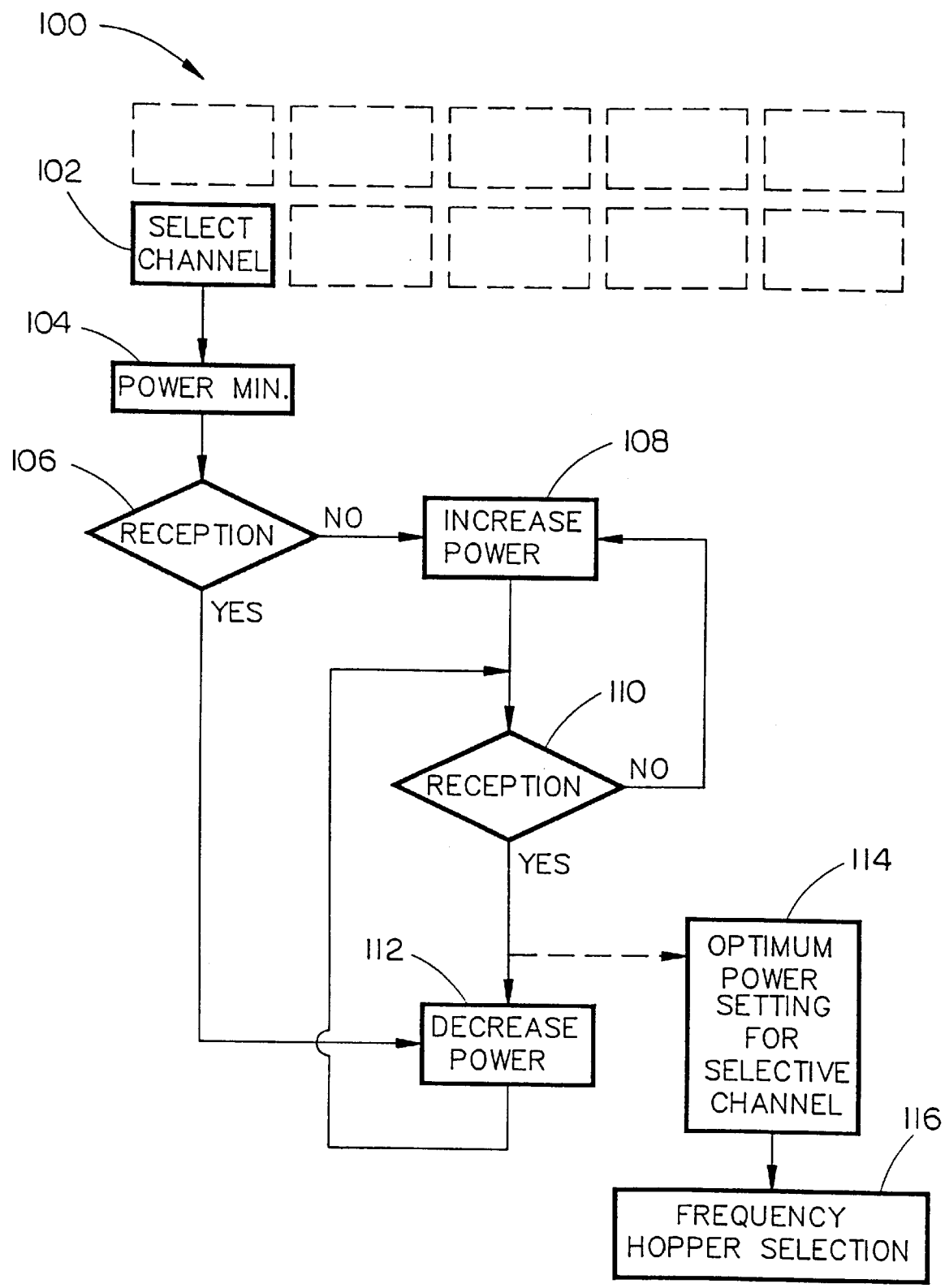
FIG. 8 is a diagrammatic illustration of a power conserving local area network channel selection schema for use in the system of the present invention.
Figure 9:
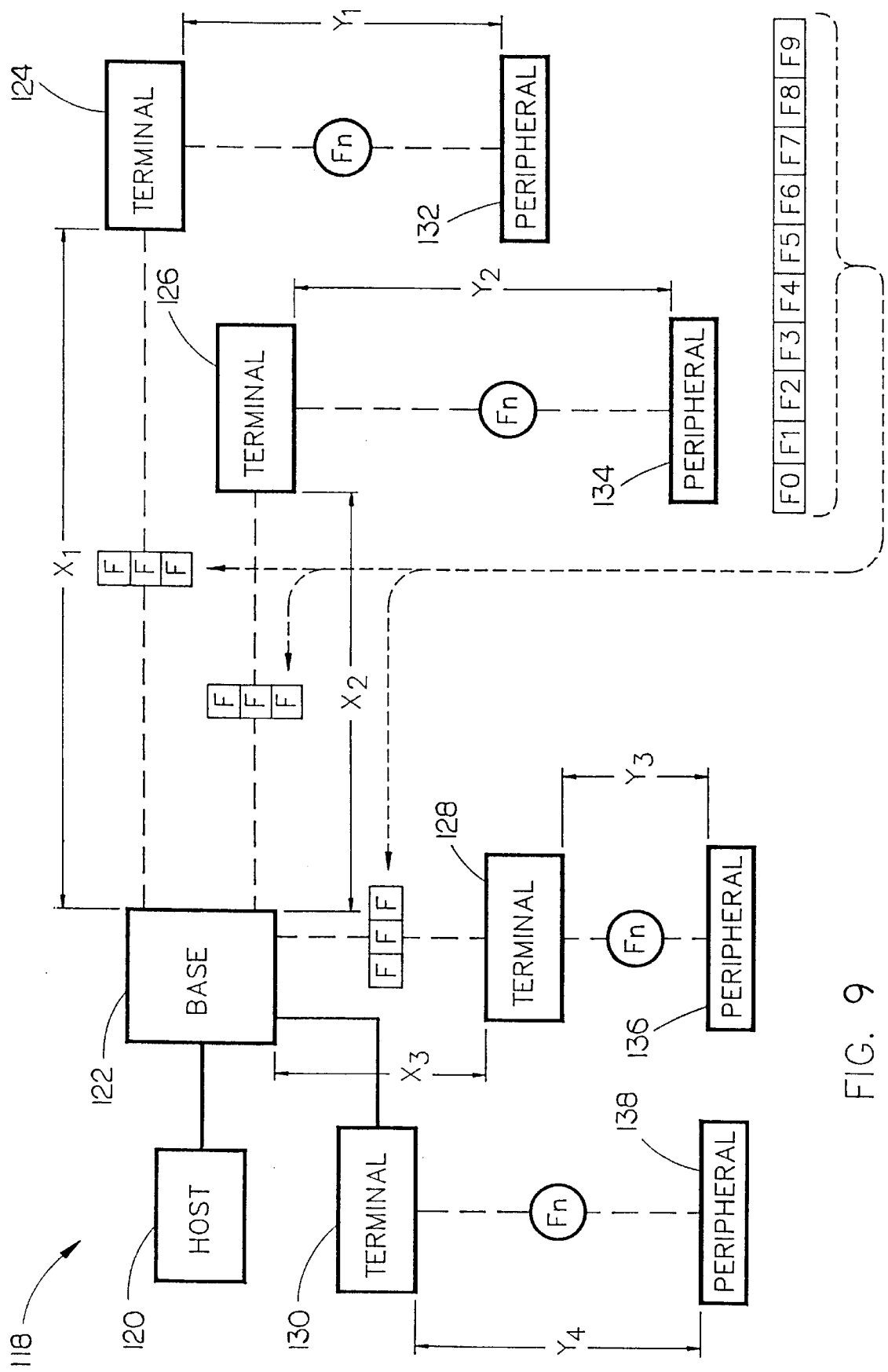
FIG. 9 is a diagrammatic illustration of a local area network schema of the present invention of the type partially illustrated, for example, in FIG. 1.

The present invention is described hereafter in terms of an exemplary embodiment for use in a warehouse or the like. It will be apparent to those skilled in the art that the invention may be practiced usefully in any industry to accomplish data collection, communication, and processing requirements. For example, as illustrated in FIGS. 1 and 2, a workperson 12 employed in a warehouse 14 may wear a wearable disintegrated computer 10 with a headset 16. The headset 16 preferably includes a personal display 18 and a microphone 20 for receiving voice recognition commands. FIG. 1 illustrates the workperson 12 reading an optically readable information set 22 on a box 24 within a warehouse 14 via a tethered optically readable information set reader 26. It will be appreciated that the reader 26 could be a laser scanner or an array based reader, likewise, the reader 26 may be wireless, working for example as is illustrated by FIGS. 8 and 9. It will also be appreciated that the workperson might be a nurse or other health care provider, for example, within a hospital reading an optically readable information set on a chart or medication or the like.

Figure 10:
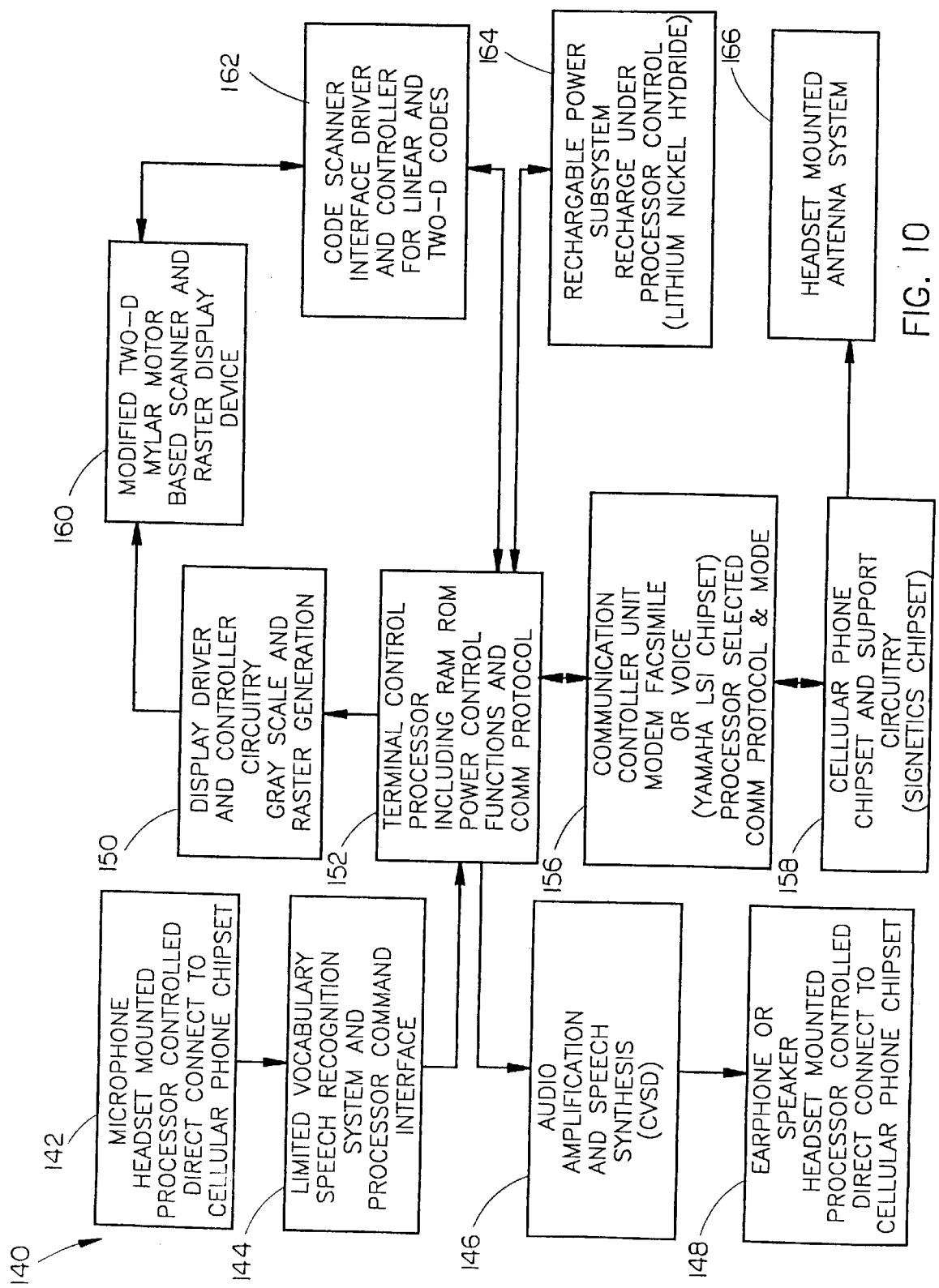
FIG. 10 is a diagrammatic illustration of an exemplary data collection and processing terminal with voice recognition and voice and data communication system.
Figure 11:
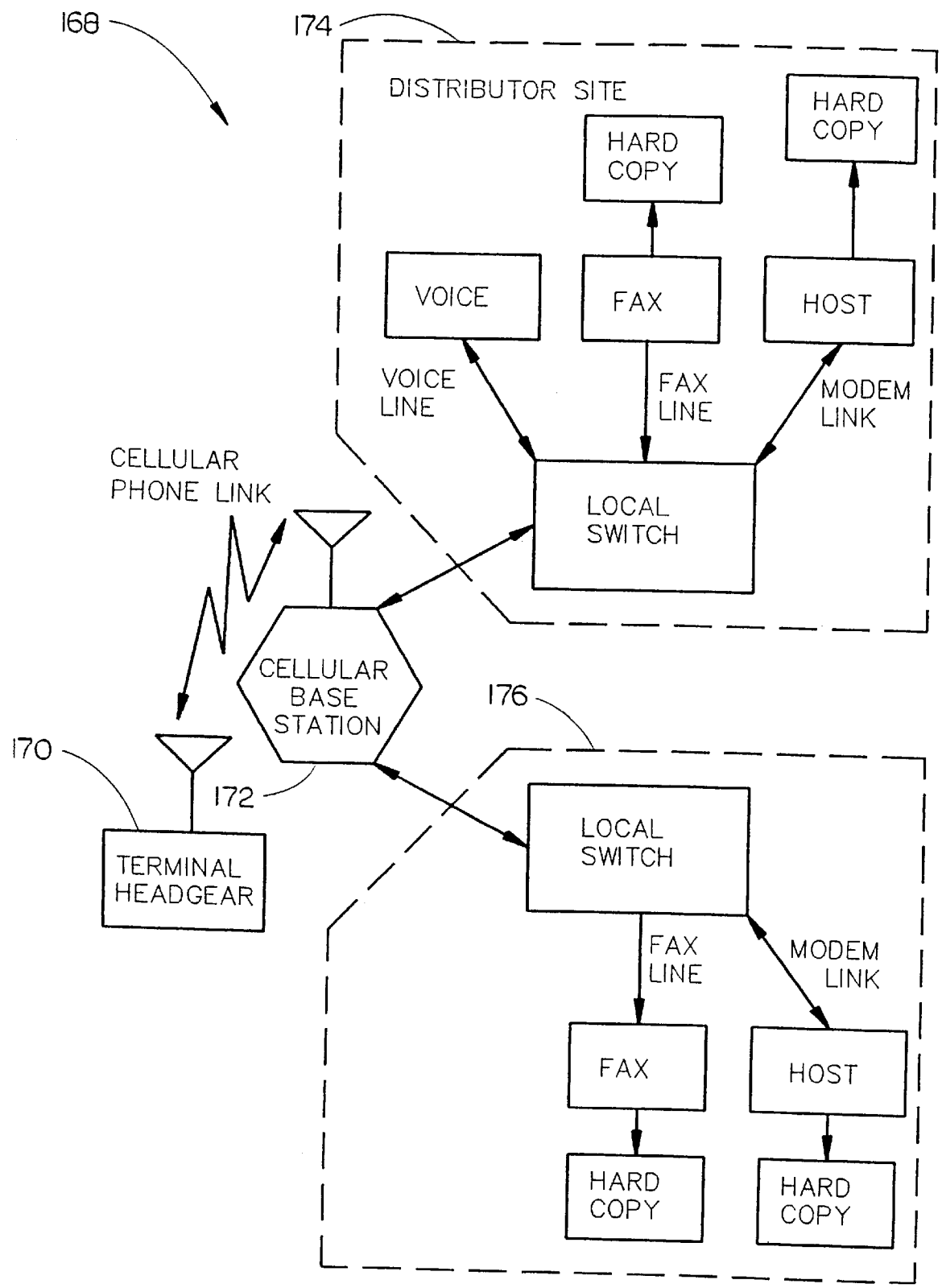
FIG. 11 is a diagrammatic illustration of an exemplary network schema utilizing a cellular communication link.
Figure 12:
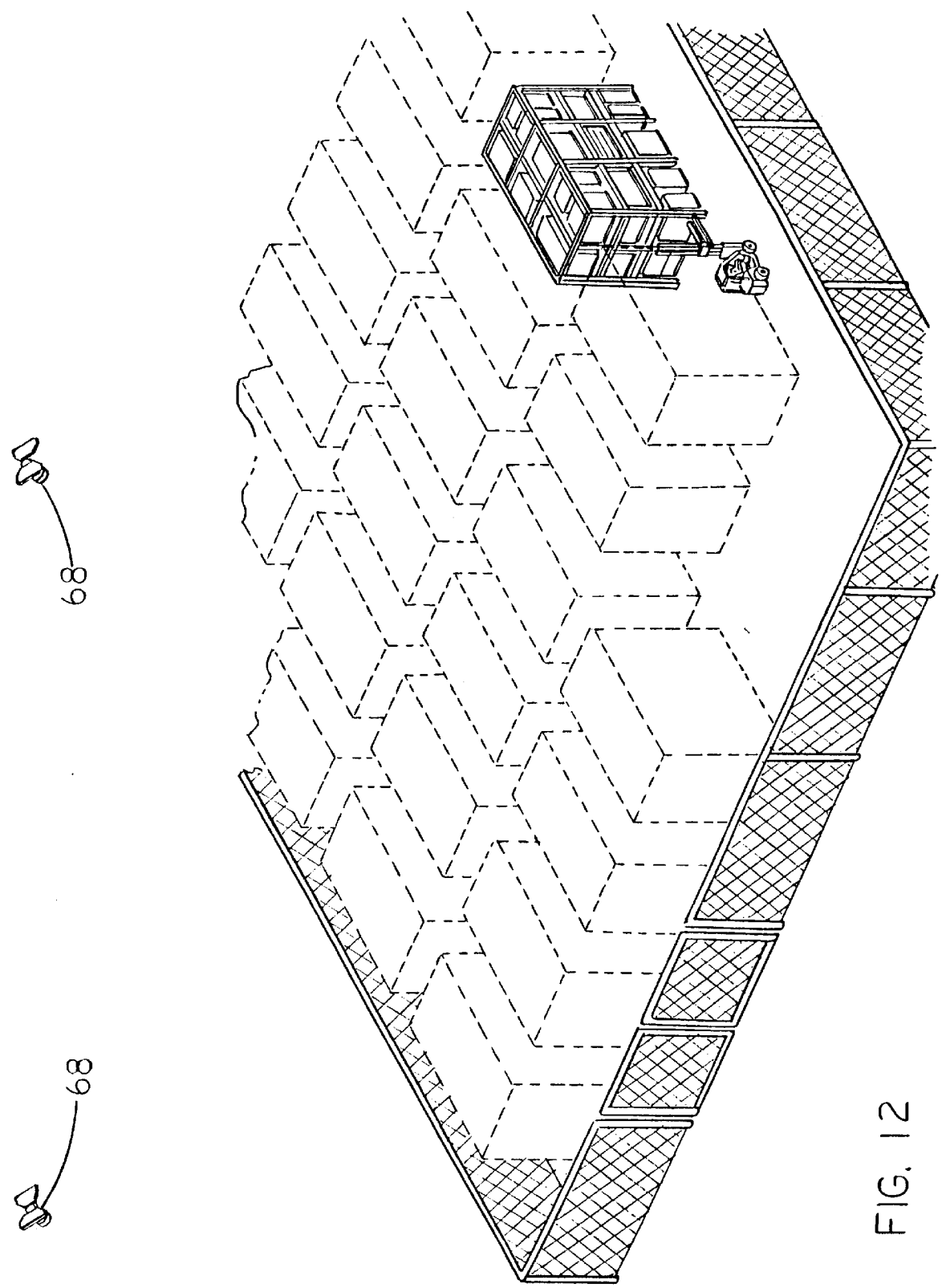
FIG. 12 is a perspective diagrammatic view illustrating an exemplary application of the system of the present invention in an open air warehouse.
Figure 13:
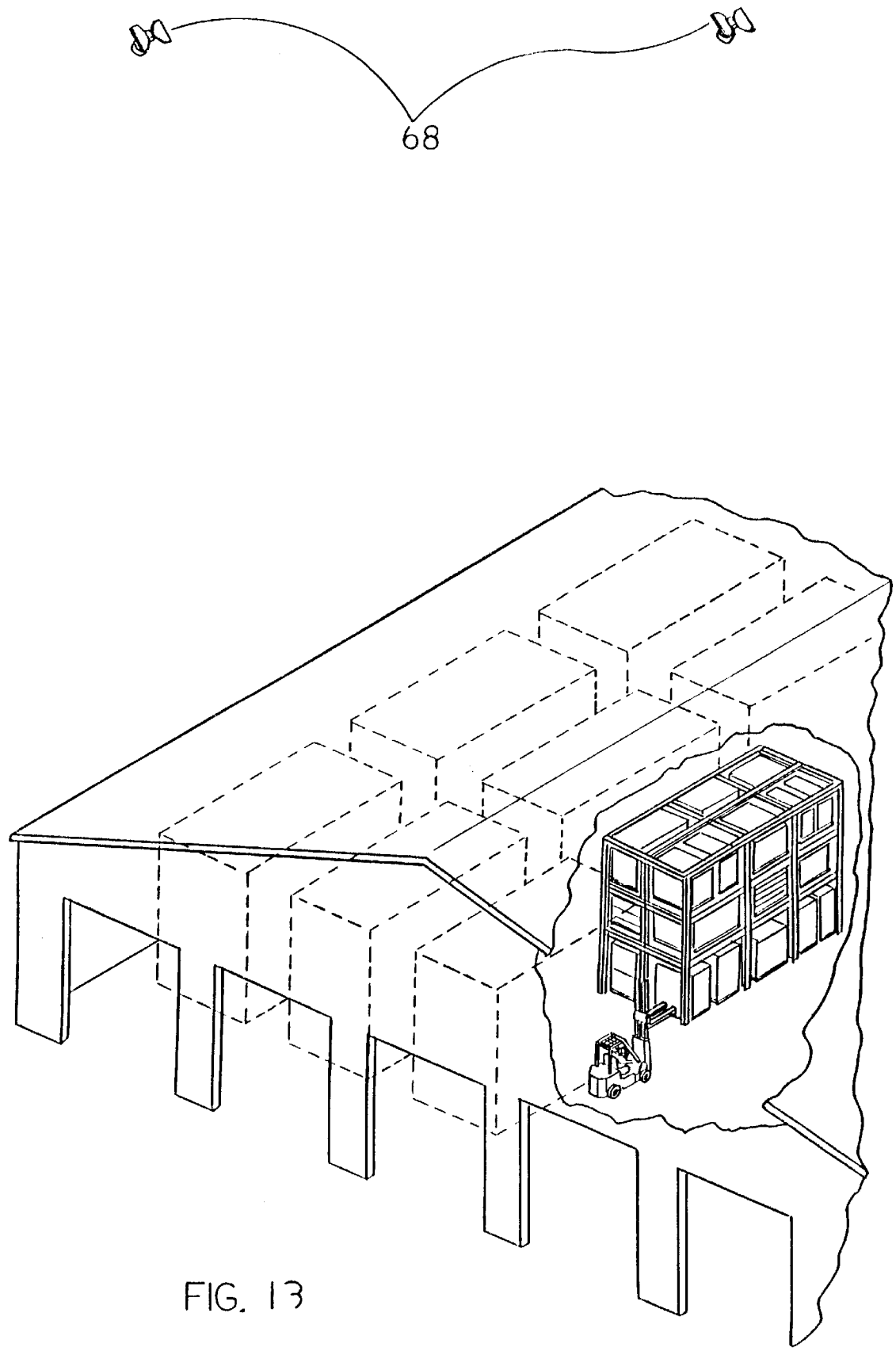
FIG. 13 is a perspective diagrammatic view illustrating an exemplary application of the system of the present invention in a warehouse.
Figure 14:
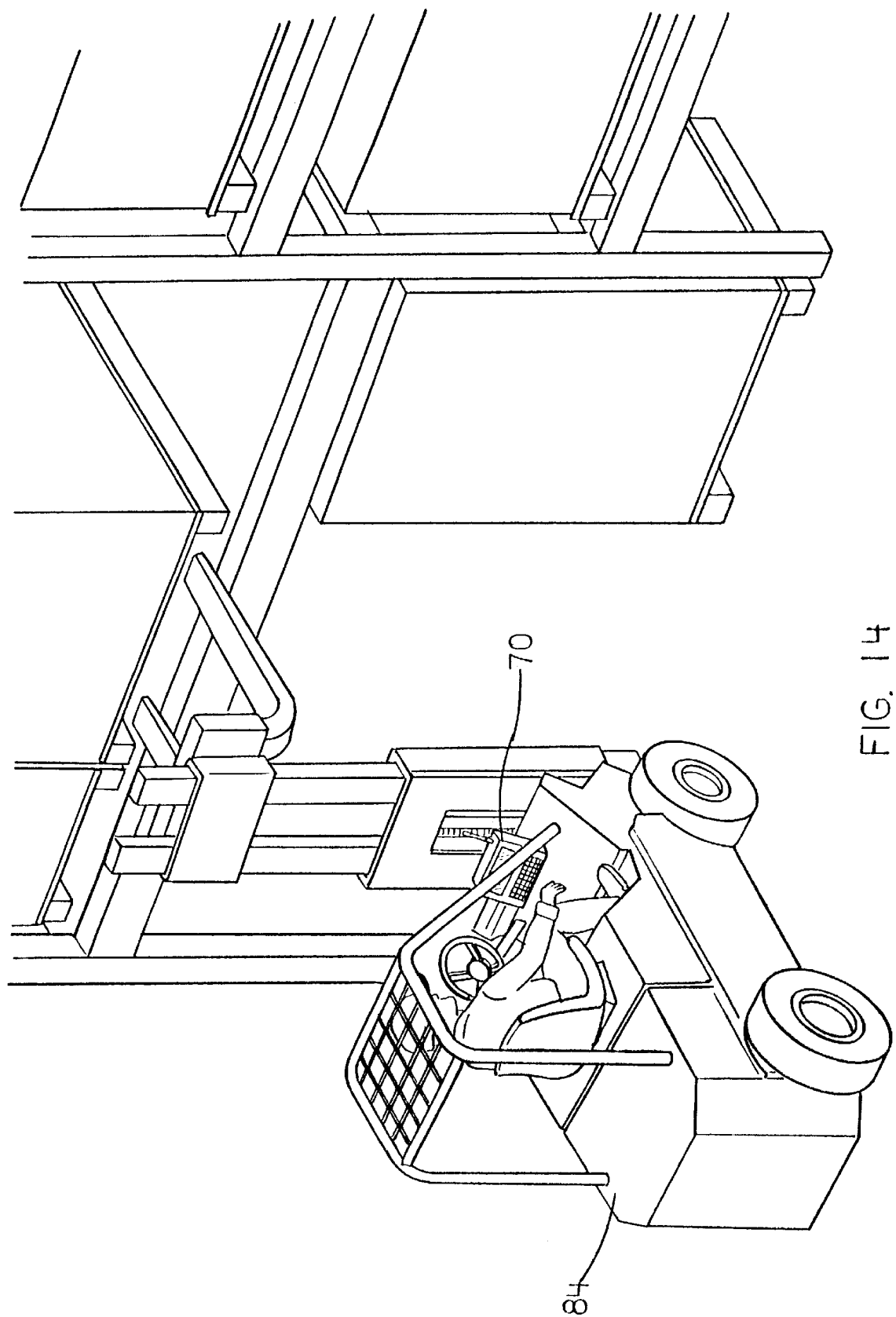
FIG. 14 is a perspective view of an exemplary embodiment of the user position and next task location device of the system of the present invention.

In operation the workperson 12 might be directed to the appropriate optically readable information set 22 via his display 18. The workperson 12 may then speak a command into the microphone 20 such as "READ" for example so as to cause the peripheral device to perform the commanded function. The workperson may be notified via his display that the information set 22 has been decoded. The information may be stored in flash memory on a flash memory feature card (feature card expansion slots 32 [for example, PCMCIA cards]) card or the like for processing later. However, the operator 12 might also issue a "SEND" command via the voice recognition microphone 20 so as to cause the, for example, multimode spread spectrum local area network (PCT Publication WO 96/38925) to communicate to a base station 36, which may for example be mounted on a forklift 34 (or other vehicle or at a fixed position within an area), or to a host computer 64 via a cellular link 38 or the like (FIGS. 10 & 11).

Figure 3:
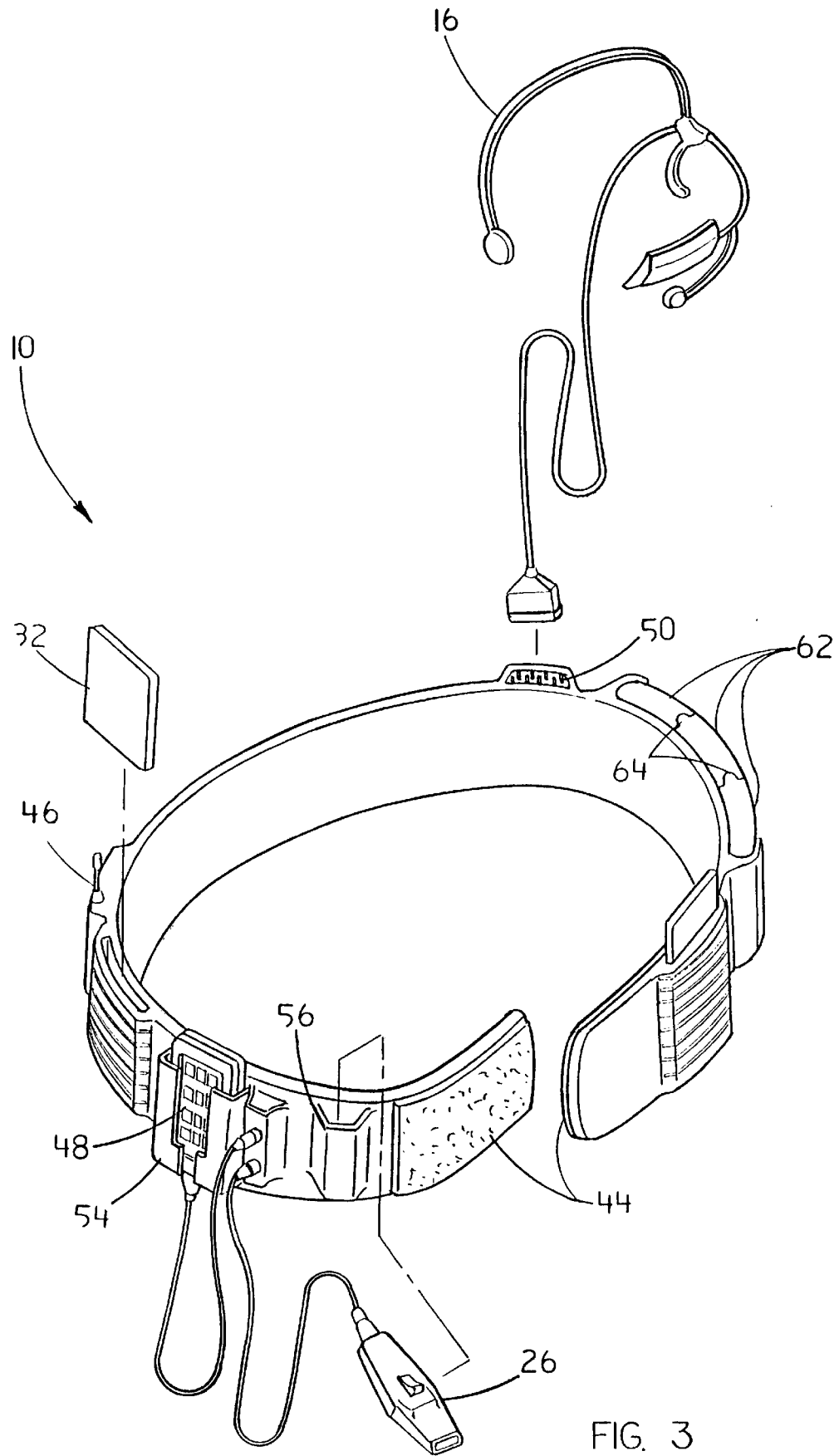
FIG. 3 is a perspective view of an exemplary wearable data collection terminal with associated headset and peripheral devices.
Figure 4:
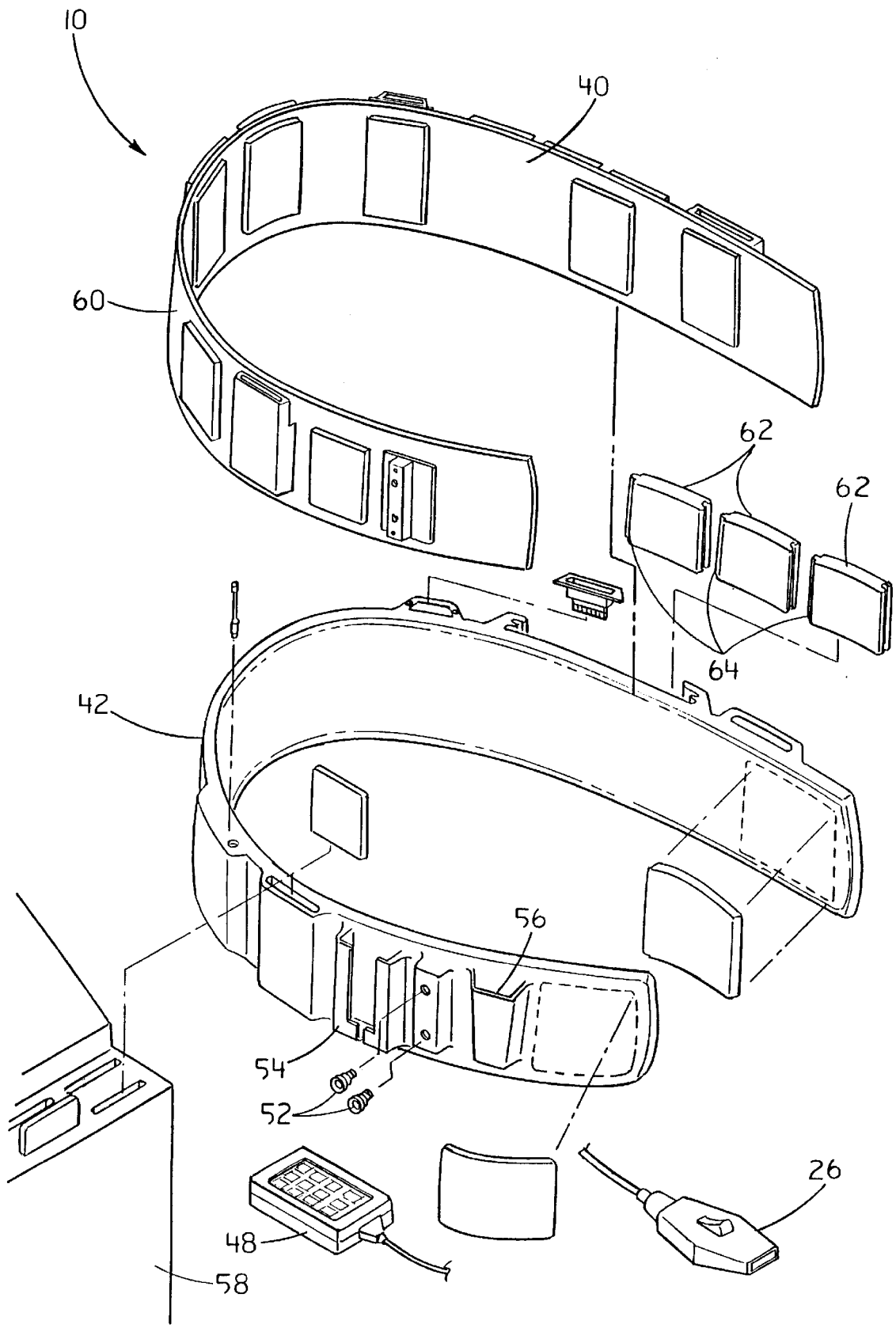
FIG. 4 is a partially exploded perspective view of an exemplary wearable data collection terminal with associated headset and peripheral devices.

As best illustrated in FIGS. 3 and 4, the wearable data collection terminal 10 and headset 16 preferably include a flex circuit 60 having a plurality of electrical connectors connected thereto for connecting PCMCIA cards having different features, for example a communication link (FIGS. 1, 9 through 11), a motherboard (such as an EPSON® CARDIO), a GPS 8-channel receiver (such as a MOTOROLA® ONCORE), a spread spectrum radio or wireless modem or the like (such as the NORAND® FALCON) [antenna 46], a removable mass storage device such as a disk drive or flash memory card [for batch downloading via a dock 58), a fax modem, or the like.

The flex circuit 60 is preferably attached to a non-stretching belt 40 and covered with a soft yet durable foam 42 (such as an antibacterial flame retardant laminate (urethane film+fabric) available from JPS Elastomerics). The terminal 10 may be held about a wearer's waist via a conventional hook and loop fastener 44. Additionally, the terminal 10 may be fabricated so as to provide support to the lumbar region of a user's back and to carry tools necessary to perform the workperson's tasks.

A variety of data collection peripherals may be tethered or wirelessly operatively connected to the terminal 10, for example a scanner 26, a keyboard 48, or a headset 16. Tethered peripherals may be connected to the terminal 10 via connectors such as 50, 52. Additionally, peripheral holders (54, 56) may be formed on the terminal 10 body for facilitating peripheral storage. Other various types of data collection peripherals may be contemplated such as a trackpad device or a touch-panel device, for example.

As illustrated in FIG. 4, intelligent battery packs 62 having a body conforming conformation (waist for example) may be pivotally (at least one axis) interconnected 64 such that the battery packs 62 may be utilized in series, parallel, in sequence, or to separately power peripherals, or the like. Each battery pack preferably includes a charge state indicator (not shown). The battery packs are preferably rechargeable while connected to the terminal 10 via a battery conditioner/charger (not shown), however, the packs 62 may also be removed for charging. Further, a back-up power supply (not shown) is preferably utilized in the event main battery pack 62 failure or the like occurs.

Figure 5:
FIG. 5 is a perspective view of an exemplary first embodiment of a headset for use with the present system.
Figure 6:
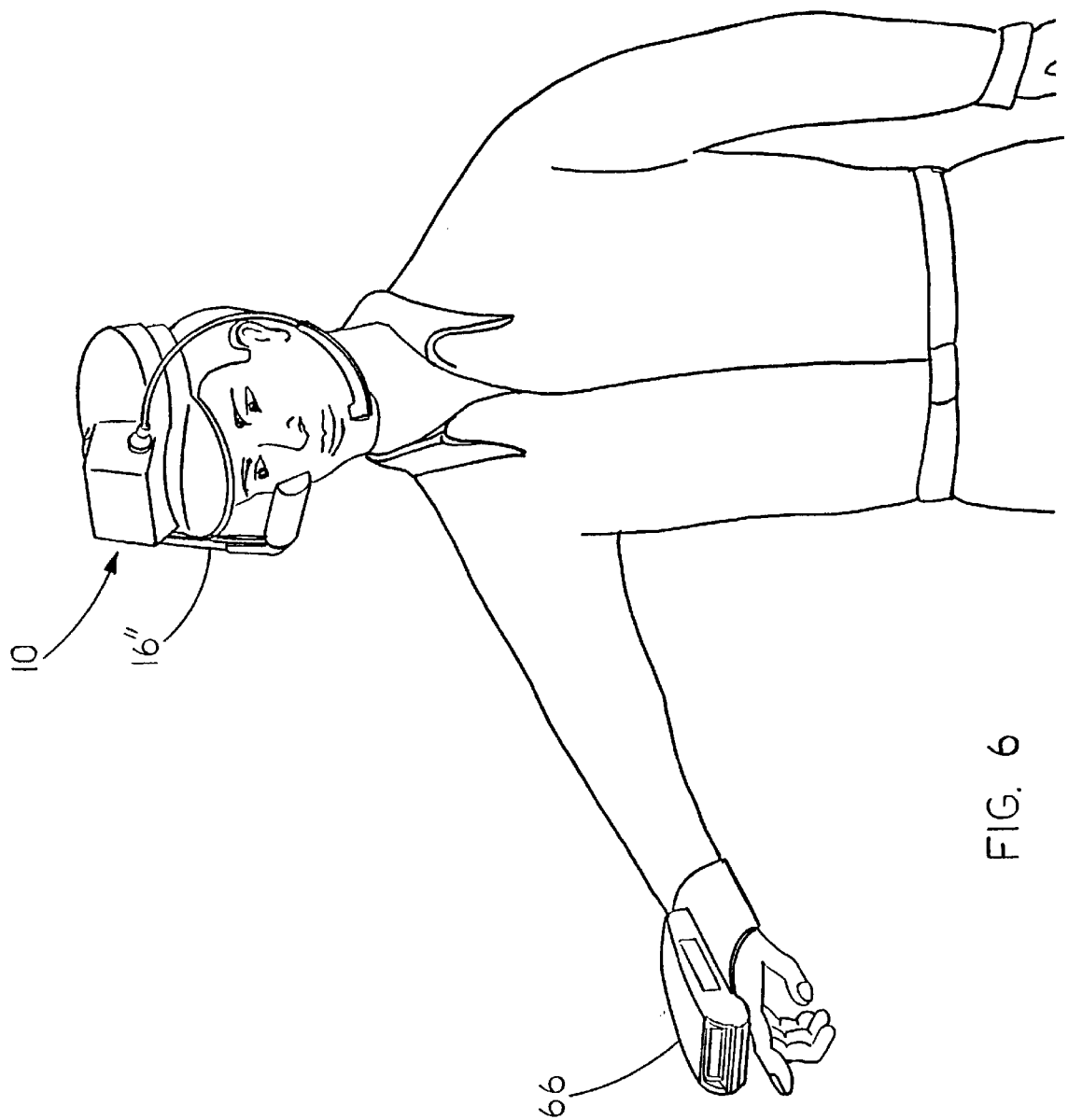
FIG. 6 is a perspective view of an exemplary second embodiment of a headset for use with the present invention which illustrates in operation a wrist worn optically readable character set reader.
Figure 7:
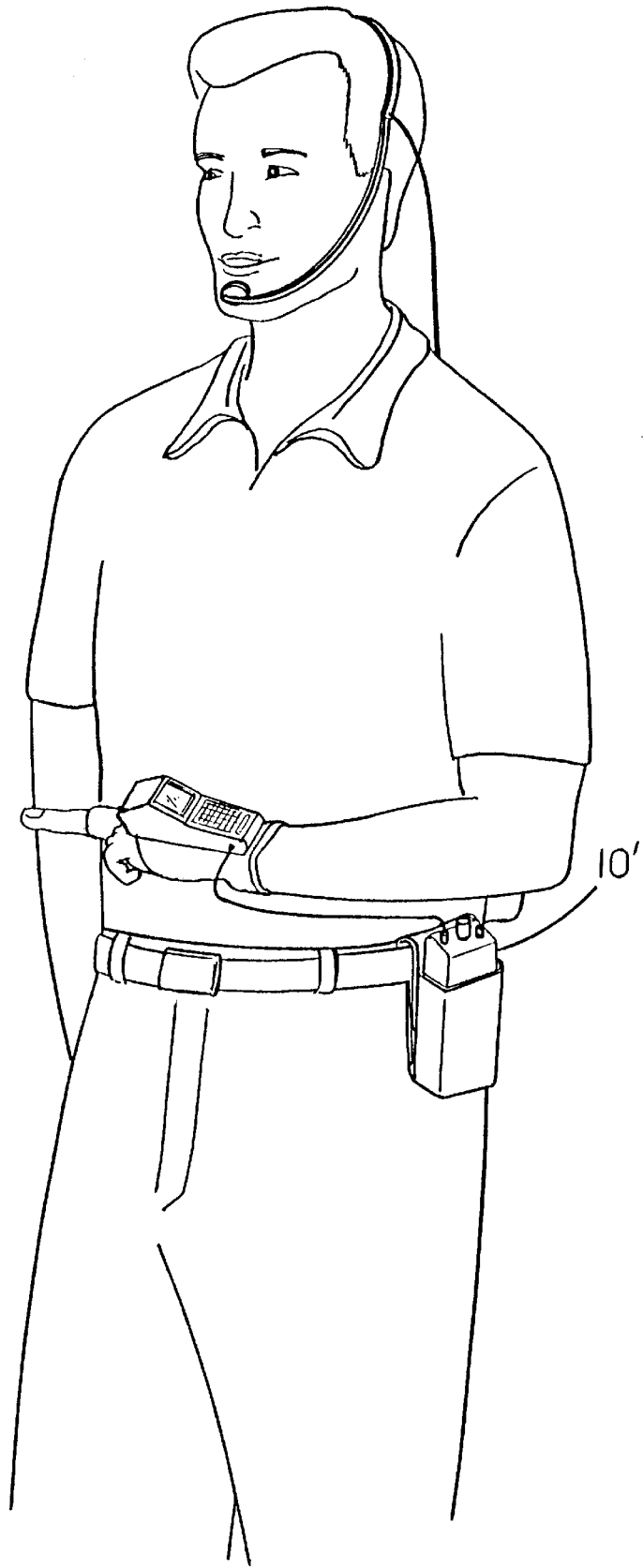
FIG. 7 is a perspective view of an exemplary third embodiment of a headset for use with a second exemplary embodiment of a wearable disintegrated data collection terminal having a wrist mounted optically readable character set reader with keypad and display and belt worn processor/ radio module with voice recognition.

FIGS. 5 and 6 illustrate various headsets (16', 16") and an exemplary handset 66 which may be utilized with the wearable disintegrated terminal 10 or the belt mounted computer 10' (FIG. 7).

FIGS. 8 and 9 illustrate a schema for selecting a channel for sending or receiving communications between various layers of the system (i.e., peripheral-terminal, terminal-peripheral, terminal-base, base-terminal, peripheral-base, base-peripheral, host-terminal, host-base, host-peripheral, terminal-host, base-host, peripheral-host). FIGS. 10 and 11 illustrate various aspects of voice and data communication within the system as well as voice recognition features of an exemplary system.

Referring now to FIG. 8, a diagrammatic illustration of a power conserving local area network channel selection schema for use in the system of the present invention is shown. As shown in FIG. 8, the schema 100 comprises a multiple channel network wherein the desired channel is selected 102. A minimum operating power level is selected 104, and the reception of a signal is tested 106. If a signal is not received, then the power is increased 108, and the reception of a signal is again tested at the new power level 110. If a signal is not received, the power is increased and the reception of a signal is tested in an iterative manner until a signal is received. At that juncture, the optimum power setting has been determined 114, and frequency hopping 116 may then occur. If at the first signal reception test a signal is received, the power is decreased 112, and the reception of a signal is subsequently tested. This process repeats in the like manner as the power increasing iterations until the signal power level converges on the optimum power level 114.

Referring now to FIG. 9, a diagrammatic illustration of a local area network schema of the present invention of the type partially illustrated, for example, in FIG. 1 is shown. As can be seen in FIG. 9, the schema 118 comprises a host 120 connected to a base 122 being in communication with a plurality of terminals 124, 126, 128 and 130. Each of the terminals in turn utilizes a peripheral device 132, 134, 136 and 138, respectively.

Referring now to FIG. 10, a diagrammatic illustration of an exemplary data collection and processing terminal with voice recognition and data communication system is shown. As can be seen in FIG. 10, the terminal 140 includes a microphone that is mounted on the headset, controlled by the processor, and directly connects to a cellular phone chip set 142. The microphone in turn connects to a limited vocabulary speech recognition system and processor command interface 144. The interface connects to a terminal control processor having RAM, ROM, power control functions and communications protocol 152. The terminal control processor connects to an audio amplification and speech synthesis CVSD 146, which in turn connects to an earphone or speaker mounted in the headset and being processor controlled and directly connected to the cellular phone chip set 148. The terminal control processor connects to a communication controller unit 156 which in turn connects to the cellular chip set and support circuitry 158 which connects to a headset mounted antenna system 166. The terminal control processor also connects to a display driver and controller 150 which connects to a scanner and raster display device 160. The scanner and raster display device connects to a code scanner interface and controller 162 which in turn connects to a rechargeable power subsystem 164.

Referring now to FIG. 11, a diagrammatic illustration of an exemplary network schema utilizing a cellular communication link is shown. As can be seen from FIG. 11, the schema 168 comprises a terminal device 170 communicating with a cellular base station 172 over a cellular phone link. The cellular base station in turn communicates with distributor sites 174 and 176.

Description of an Exemplary User Position and Next Task Locator Device

FIGS. 12 through 16 illustrate a user position and next task location device for use within the present system. In an exemplary embodiment a global positioning system (utilizing satellites 68) and a GPS receiver (preferably on a feature card meeting PCMCIA standards). A plurality of proximity indicating devices for indicating telemetry within the three dimensional volume of a building or the like may also be utilized where a GPS based system lacks the accuracy required (not shown) or the like.

Figure 15:
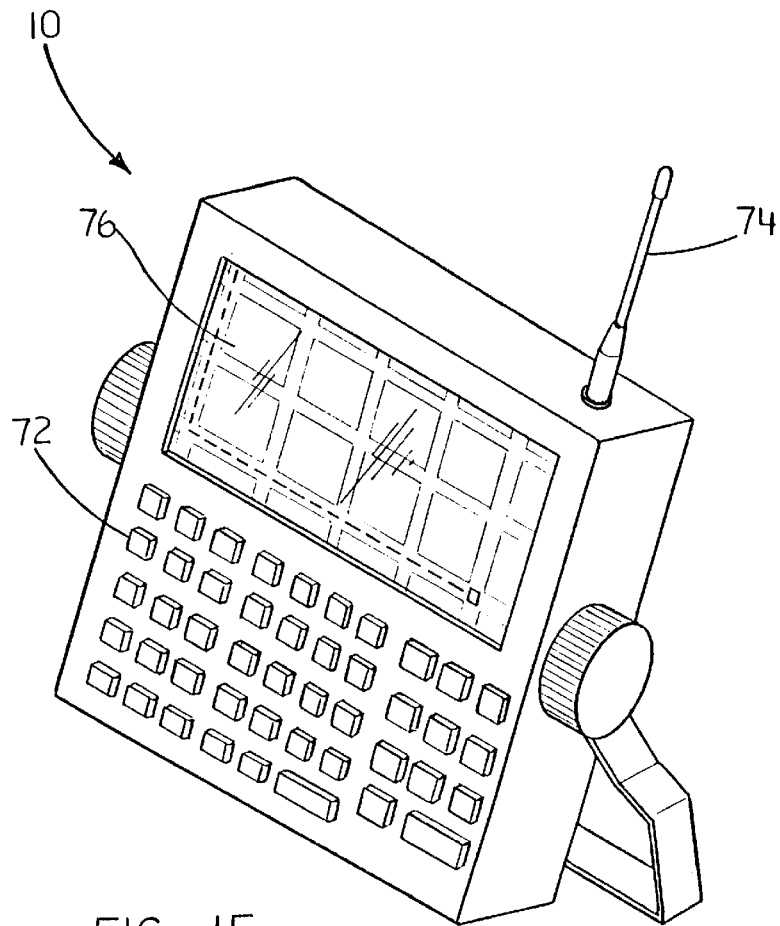
FIG. 15 is a perspective view of an exemplary vehicle mounted terminal of the present invention for data collection (and user position and next task location) of the system of an exemplary embodiment of the present invention.
Figure 16:
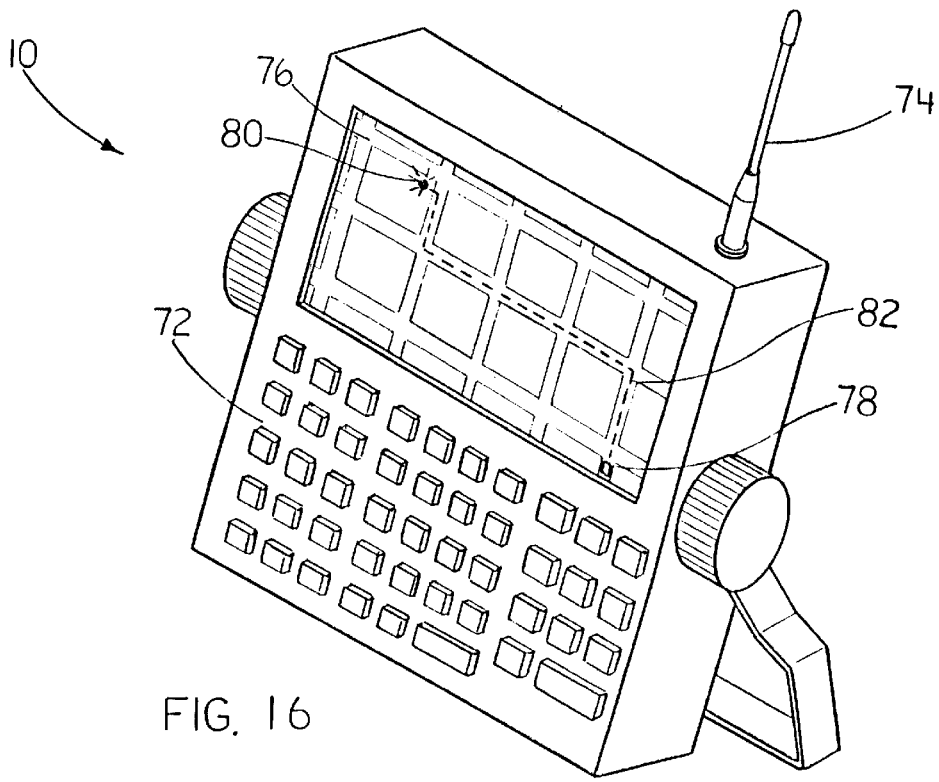
FIG. 16 is a perspective view of an exemplary vehicle mounted terminal of the present invention for data collection (and user position and next task location) of the system of an exemplary embodiment of the present invention.

In operation, as illustrated in FIGS. 15 and 16, the device 70 may be mounted on a vehicle (forklift 84; however, the device may also be included in the terminal 10), having a keypad 72, antenna 74, and display 76 may be utilized to display the user's position 78 and next task location 80, as well as the best route 82 to the next task.

Figure 17A:
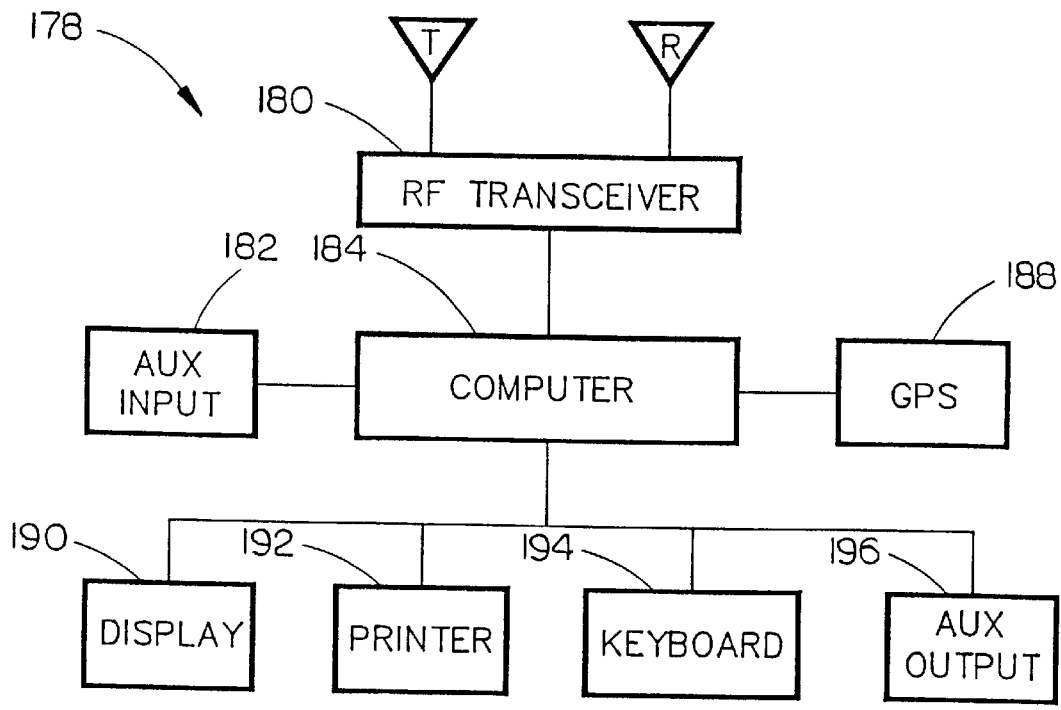
FIG. 17A is a diagrammatic illustration of an exemplary embodiment of the vehicle mounted terminal of the present invention for data collection (and user position and next task location) of the system of an exemplary embodiment of the present invention.

Referring now to FIG. 17A, a diagrammatic illustration of an exemplary embodiment of the vehicle mounted terminal of the present invention for data collection (and user position and next task location) of the system of an exemplary embodiment of the present invention is shown. As can be seen from FIG. 17A, the terminal 178 comprises an RF transceiver 180, a computer 184, an auxiliary input 182, a GPS system 188, a display 190, printer 192, keyboard 194 and auxiliary output 196.

Figure 17B:
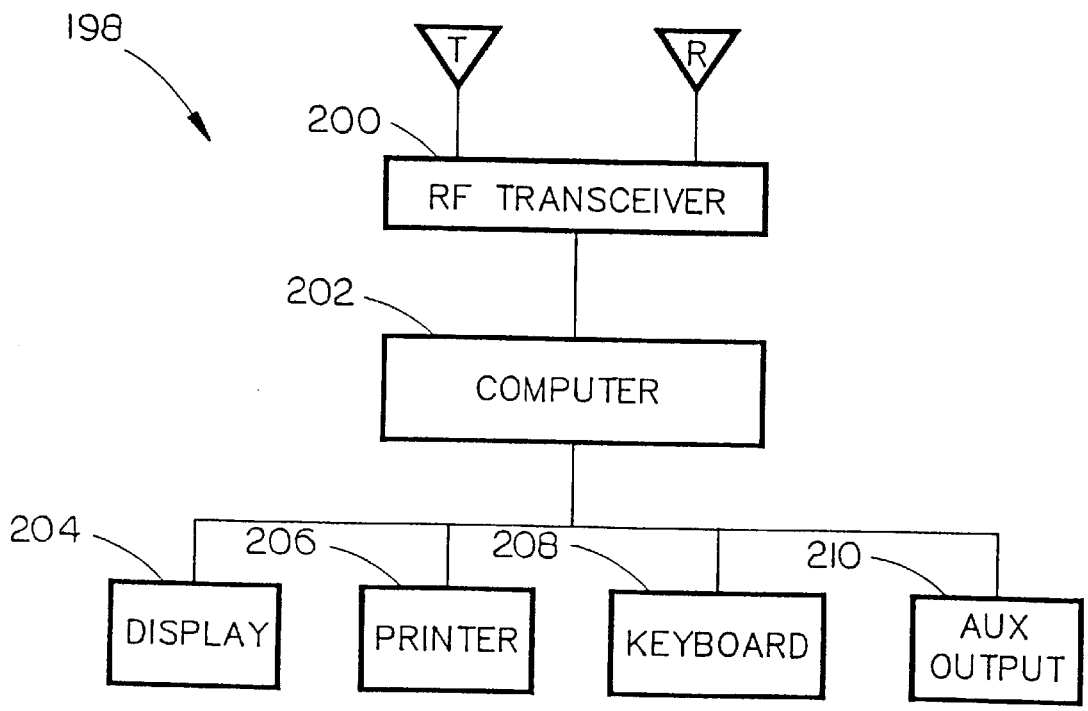
FIG. 17B is a diagrammatic illustration of an exemplary embodiment of the vehicle mounted terminal of the present invention for data collection of the system of an exemplary embodiment of the present invention.

Referring now to FIG. 17B, a diagrammatic illustration of an exemplary embodiment of the vehicle mounted terminal of the present invention for data collection of the system of an exemplary embodiment of the present invention is shown. As can be seen from FIG. 17B, the terminal 198 comprises an RF transceiver 200, a computer 202, a display 204, printer 206, keyboard 208 and auxiliary output 210.

Description of a Voice System for a Portable Data Terminal System

A portable data terminal may utilize radio frequency data communication and may be either hand-held or mounted in a mobile vehicle such as a forklift. In the hand-held configuration, the terminal is preferably attachable to the operator's waist with a type of belt loop. A carrying case for the terminal may attach to the belt and thereby carry the data terminal. In the mobile vehicle configuration, the data terminal is utilized in conjunction with a communications adapter which allows the terminal to be removably mounted in the vehicle such that the operator may momentarily seize the terminal and roam in the vicinity of the vehicle for hand-held operation. In both the hand-held and vehicle mounted modes, a tethered laser scanner is preferably used for data input of optically readable data files.

The portable data terminal may be most frequently utilized in industrial environments which contain high levels of ambient noise. The high ambient noise levels interfere with the ability of the operator to hear the audio transducer, or buzzer, in the terminal which provides the user with audio signaling information. A buzzer type audio transducer has limited modes of annunciation to communicate information to the operator. A buzzer generally may only communicate to the operator by varying the number and frequency of the buzzes, varying the tone of the buzzes or varying the volume of the buzzes. For example, the buzzer is frequently utilized to annunciate keystrokes or to indicate whether a data file has been successfully scanned. The limitations of the buzzer combined with high ambient noise levels often diminish maximum utilization of the portable data terminal. Further, a buzzer is incapable of communicating complex feedback information to the operator.

It is therefore desirable to provide a portable data terminal which implements a voice communications system for improved system utilization and data collection accuracy. Further, it is desirable to provide a portable data terminal having a voice communications system further including voice recognition capability.

The portable data terminal having a voice communications system preferably provides operator controlled speaker volume, and externally mountable speaker for terminal mounting flexibility, and a headset for external headphones and microphone capabilities. The voice communications system provides an indication of whether a scan was successful or unsuccessful and, if successful, the type of information field scanned. The voice system may provide further information and interpretation of the content of the data in the scanned field. Several standard phrases may be stored in an electronic storage medium, and custom voice phrases may be entered and saved into the data terminal by the user and integrated into the voice communication system.

Further audio processing functions may be provided such as tone controls and equalization, automatic gain control and volume adjustment, noise cancellation and filtering, and multilingual capability including recognition and translation capability. The same voice system may be utilized in both the hand-held modes and mobile vehicle mounted modes, preferably constructed in a self contained module, which may conform to PCMCIA standards, for example. The terminal and voice system module is preferably constructed in an environmentally sealed enclosure, wherein the module may have a maximum weight of four ounces. The voice recognition system is preferably uprgradable without the need to redesign or change the hardware.

In a portable hand-held terminal having the voice communications system, the terminal is preferably self-contained and has a rechargeable battery pack which may operate eight hours on a full charge. Embodiments which utilize external audio input and output devices may preferably operate from the data terminal battery pack.

The portable data terminal having a voice communications system may also provide built-in self test capability without the need for external data or test equipment to interface with the terminal. The operator may rapidly determine whether the voice communications system is properly functioning, for example by listening to sample audio output. The user may also provide voice input as part of the test routine, for example having words spoke into the microphone searched in the system storage media and output from memory to the speaker for a comparison by the operator.

Visual indicators may be preferable provided to operate in conjunction with the voice communications system. For example, a green visual indicator may signal that the terminal is powered on, and a pulsing red illuminator may indicate a low battery energy state. Voice annunciation cues may be used simultaneously with the visual indicators such as a repeating voice cue that may say "BATTERY ENERGY IS LOW."

The voice communications system may provide foreign language capability as well as English language capability. Text to speech translation is preferably provided as well. Multilanguage capability may be provided which is preferred for use in countries where several languages may be spoken in a particular area such as European countries.

Flash memory is the preferred electronic storage medium because of its nonvolatility. New program code may be downloaded into the flash memory device as needed, which may also function as ROM storage for the voice communications system operating code. Several type of connectors, preferably the captive type, are provided for data transfer into and out of the voice communications system.

A low impedance external speaker may be provided for mounting on a mobile vehicle. The speaker preferably provides uniform omnidirectional sound dispersion and is capable of producing a clear audio output in a 20 foot radius. The speaker is preferably designed to be easily mounted onto a mobile vehicle.

A portable data terminal having a voice communications system preferably operates from a direct current power source when mounted on a mobile vehicle. Captive type audio cables are preferably utilized between the terminal and any external components or accessories. An optional clip on speaker may be provided for hand-held use when headphones are not desired. Alternatively, a headset may provide earphones only, or preferably provides earphones and a microphone. The headset is preferably of a lightweight yet durable and robust construction. An optional battery pack module may be provided for auxiliary power and may be rechargeable in a wall mounted recharger. The battery pack preferably comprises a six cell, 650 mA-Hr, 7.2 volt nickel-cadmium pack. The battery pack module preferably is clipped onto a waistband or belt and is preferably curved to conform to the operator's body.

The portable data terminal having a voice communications system is preferably as ergonomic, small and lightweight as possible. The terminal and voice communications system preferably meets all environmental and communications regulations and is capable resilient to electromagnetic interference and electrostatic discharge.

An exemplary voice communications system may interpret an incoming data stream and generate natural sounding full human speech. Alternatively, lower quality but discernable speech may be utilized to preserve processing power. The voice communication system preferably provides voice recognition capability multiple communications modes which may be selected and controlled by the system software. The software routines are preferably easily programmable.

During operation of the voice communication system, a variety of information may be indicated to the terminal operator. For example, if a scan was in any way incomplete, the system may indicate aurally "BAD SCAN." If the scan was successful, the system may indicate the type of information field scanned, such as "SERIAL NUMBER" or "PART NUMBER." After the type of information field scanned is indicated to the operator, the system preferably interprets the scanned data such as "SERIAL NUMBER . . . 988524X." Also, descriptors of the action taken with the data may also follow such as "PART NUMBER . . . GT5881 . . . COUNTED." The aural indication may preferably follow the pattern "<field type> . . . <field data> . . . <action>." Other information may be indicated such as "PART NOT FOUND," "ENTER SIGN-ON INFORMATION" or "PLEASE SCAN DATA," for example.

In an exemplary embodiment of the present invention, the voice communications system is fully integrated with a radio frequency voice and data system such that voice and data communications may be provided between multiple operators and nodes in the communications network. Voice information such as "PLEASE OBTAIN INFORMATION ON PRODUCT QZ9000" may be communicated to the system operator via the radio frequency network from a central communications node, for example. In an exemplary embodiment, the voice communications system is implemented on a single LSI or VLSI chip having A/D and D/A convertors and digital signal processing capability, such as the HM 2007 CMOS voice chip available from Hualon Microelectronics Corporation of Taipei, Taiwan. The voice communications system is preferably implemented on a computer feature card of a type conforming to PCMCIA standards.

Description of an Exemplary Personal Display

Figure 20:
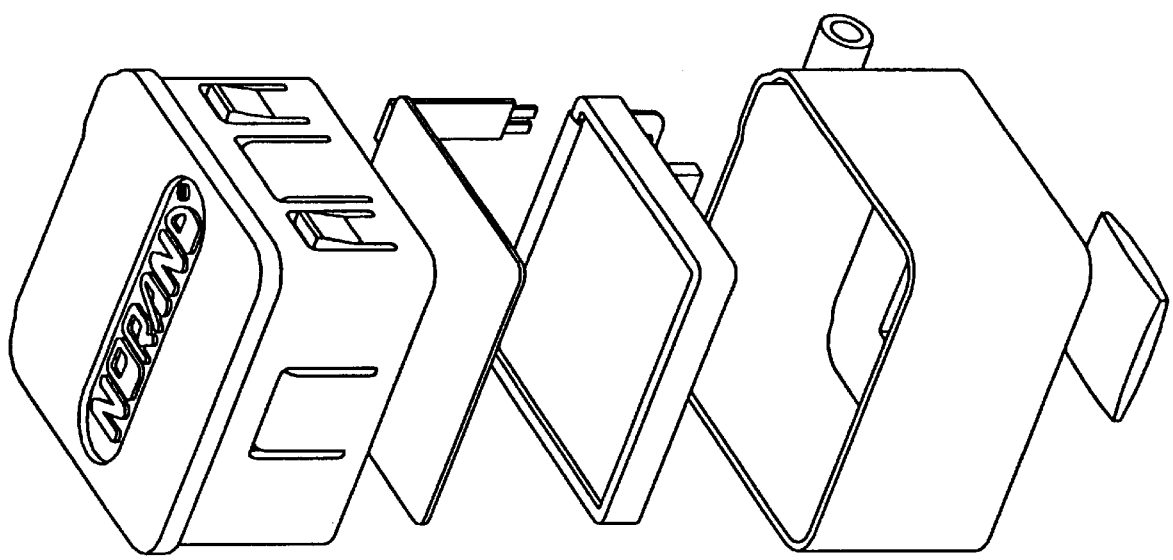
FIGS. 20 and 21 are perspective views of an exemplary color display module for use with the system of the present invention.
Figure 21:
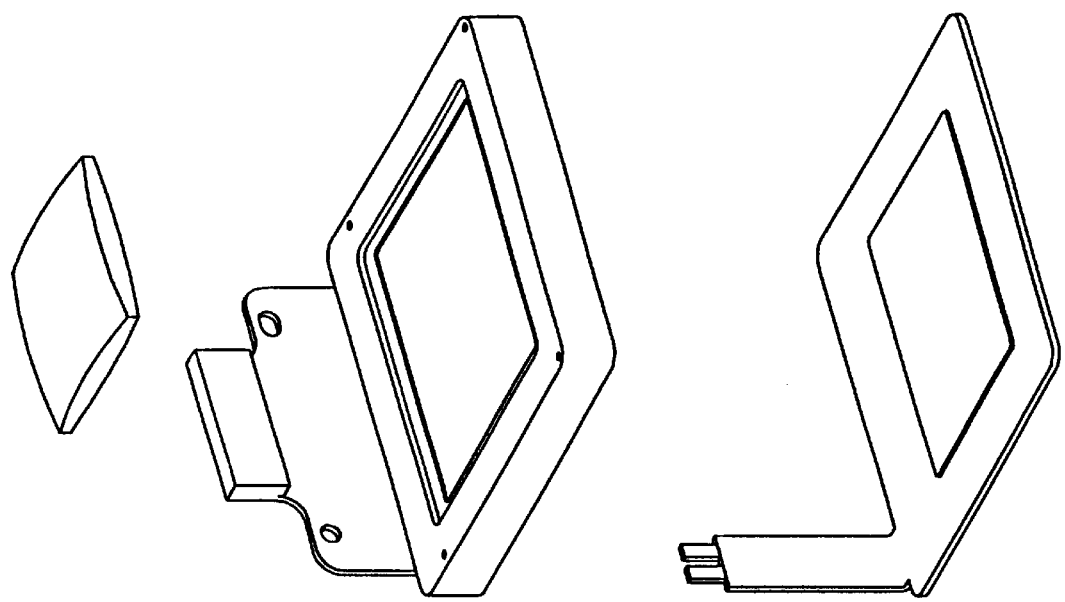

In a preferred embodiment of the present invention, data terminal of the data collection system may utilize a 0.7 inch diagonal active matrix display panel of super thin film polycrystal silicon transistors with built in display drivers (FIGS. 20 and 21). The preferred display provides full-color video display capability in NTSC display mode and is PAL compatible. The RGB pixels are preferably arranged in a delta pattern to provide high picture quality without the fixed color pattern inherent in vertical stripe and mosaic pattern arrangements.

The display preferably provides 103,000 pixels having a horizontal resolution of 240 lines. The display preferably provides a light transmission factor of 2.1% and preferably provides built-in horizontal and vertical display drivers having polycrystal silicon transistors. The RGB delta configuration provides smooth picture quality. The display further provides a built-in RGB decoder for converting composite video signals into RGB video signals and is compatible with NTSC and PAL systems.

Description of FIGS. 18 Through 26

Figure 18:
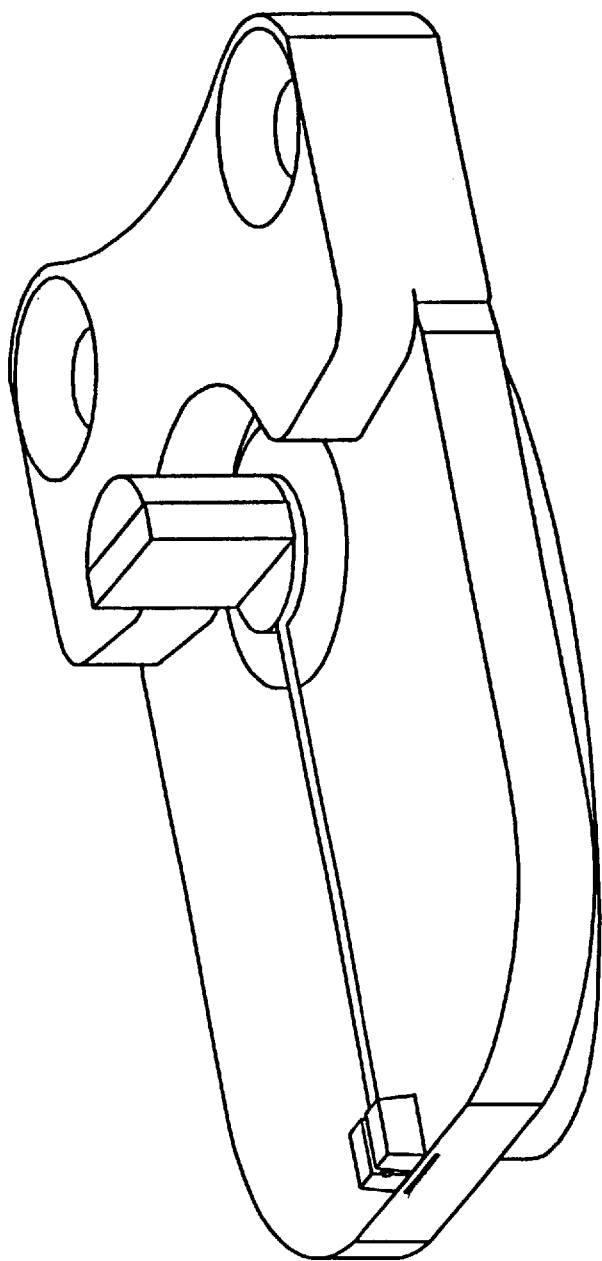
FIG. 18 is a perspective view of an exemplary embodiment of a laser scanner engine for use in an exemplary embodiment of the present invention.
Figure 19:
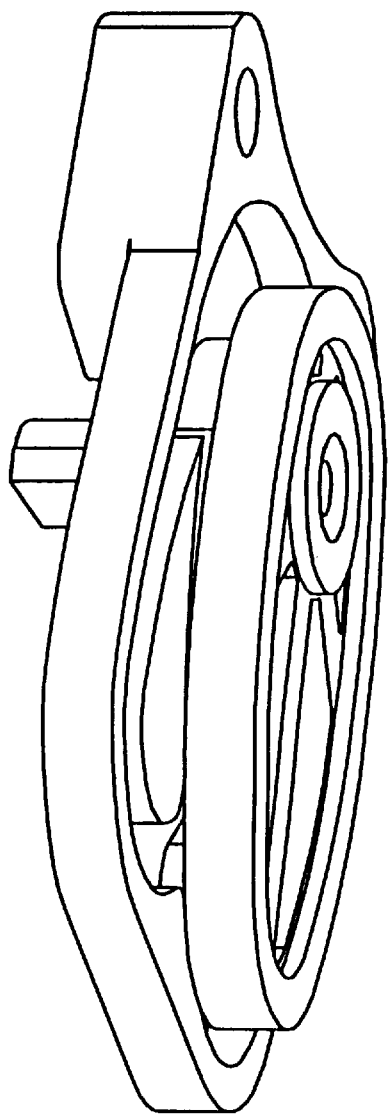
FIG. 19 is a perspective view of an exemplary embodiment of a laser scanner engine for use in an exemplary embodiment of the present invention.

FIGS. 18 and 19 illustrate a laser beam deflector mechanism which may be utilized in a laser scanner. A mirror having a diagonal measurement of 3.0 mm is rotatably mounted on a rotating shaft assembly. A steel wire spring system comprising clock hairspring or piano type wire is securely attached to the rotating shaft assembly at a first end and securely fixed to the deflector mechanism housing at a second end. As shown in FIG. 19 an electric rotary solenoid assembly has a coiled loop of a given inductance value coupled with a capacitor to form a resonant LC tank circuit. The electronic resonance of the LC tank circuit is coupled to and designed to match the resonance of the spring system formed by steel wire and the rotating shaft assembly. When the field coils of the rotary solenoid assembly are trickle-driven (i.e. pulsed with a trickle current at the resonant frequency of the commutating coil frequency), the system will resonate such that the shaft is rotatably driven in an oscillating manner. When a laser beam is pointed at the oscillating mirror, the beam will be reflected from the mirror in a linear oscillating movement. The laser beam and deflector mechanism may be thereby positioned to linearly scan back and forth over a predetermined area at the resonant frequency to scan an optically readable data file such as a standard bar code.

The video display system as shown in FIGS. 20 and 21 preferably utilizes an active matrix CCD color video display having a 0.7 inch diagonal measurement and 122,000 pixels such as the type available from the SONY corporation. The display system shown in is designed to be implemented as a personal single eye video viewer which may be mounted on a headset or hat of the operator for heads up viewing.

Figure 22:
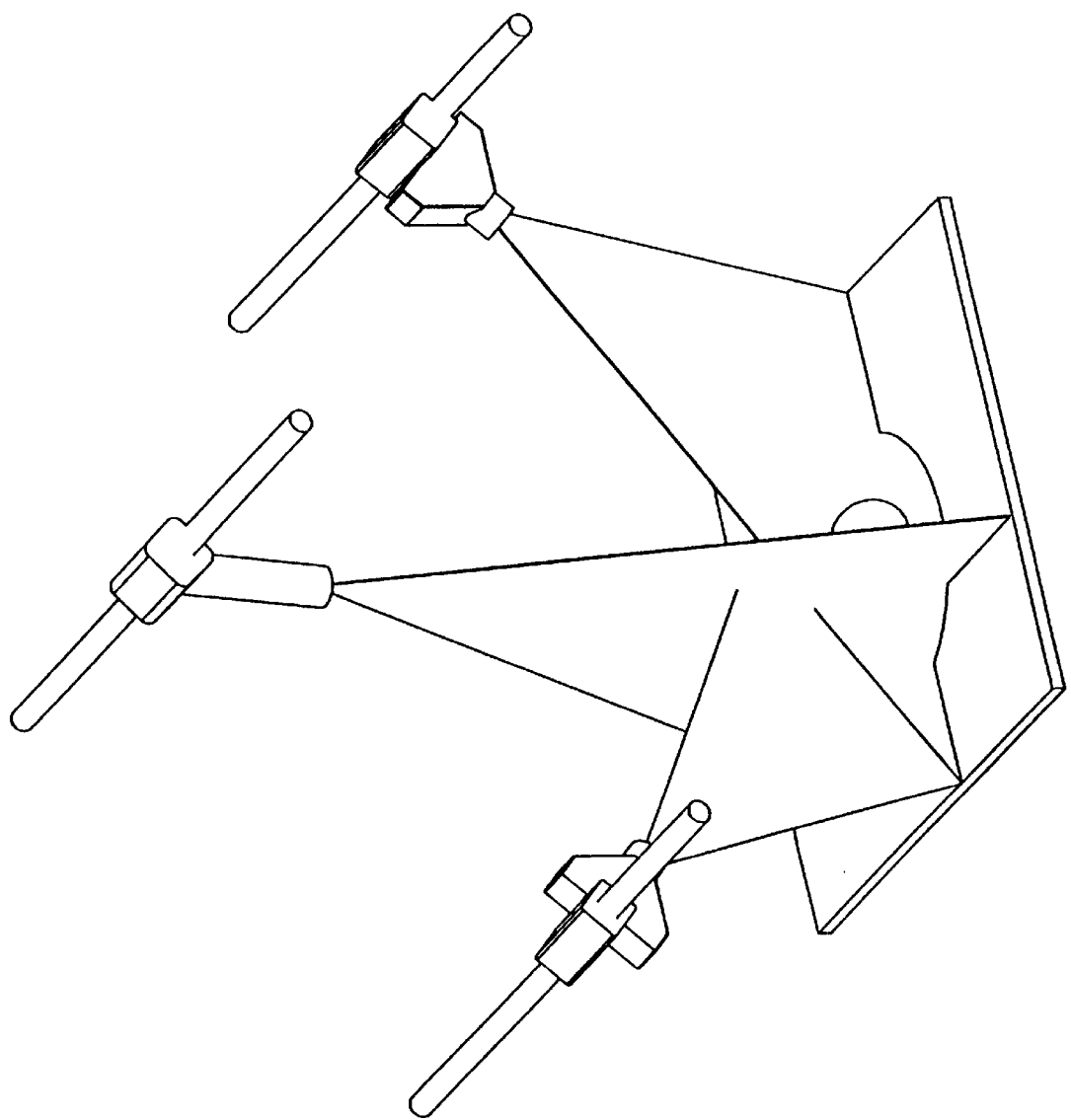
FIGS. 22 and 23 are perspective views depicting a preferred three-dimensional orthogonal scanner, or "profilometer" of the present invention.
Figure 23:
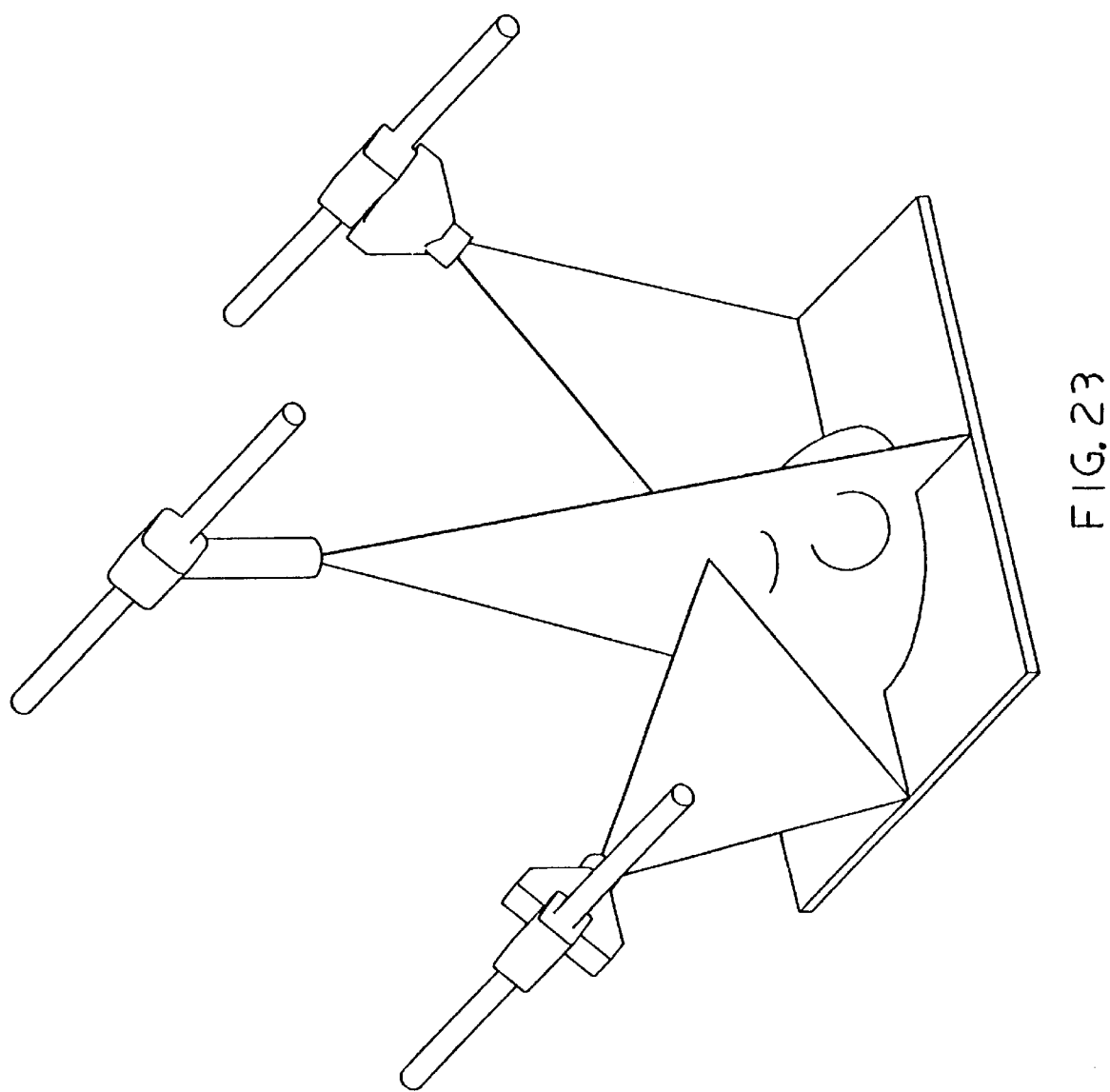

FIGS. 22 and 23 depict a preferred three-dimensional orthogonal scanner, or "profilometer" of the present invention. The scanner may comprise a beam generating unit which produces a wide fan-beam such as available form the Melles-Griot Company. The three dimensional scanner may scan and read the three-dimensional surface contours of a three-dimensional surface which may have complex non-symmetrical non-uniform features. Information may be encoded within the particular shape, contour and features of the three-dimensional surface which is extractable by the scanner.

Figure 24:
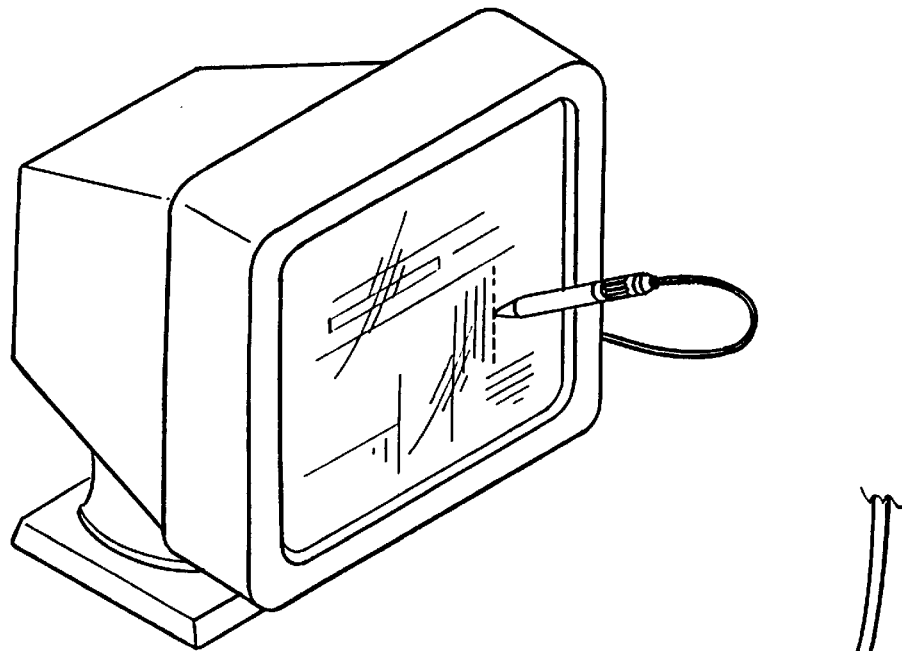
FIGS. 24 through 26 are perspective views of a color data input stylus for use with a color display of the type illustrated, for example, in FIGS. 15 and 16.
Figure 25:
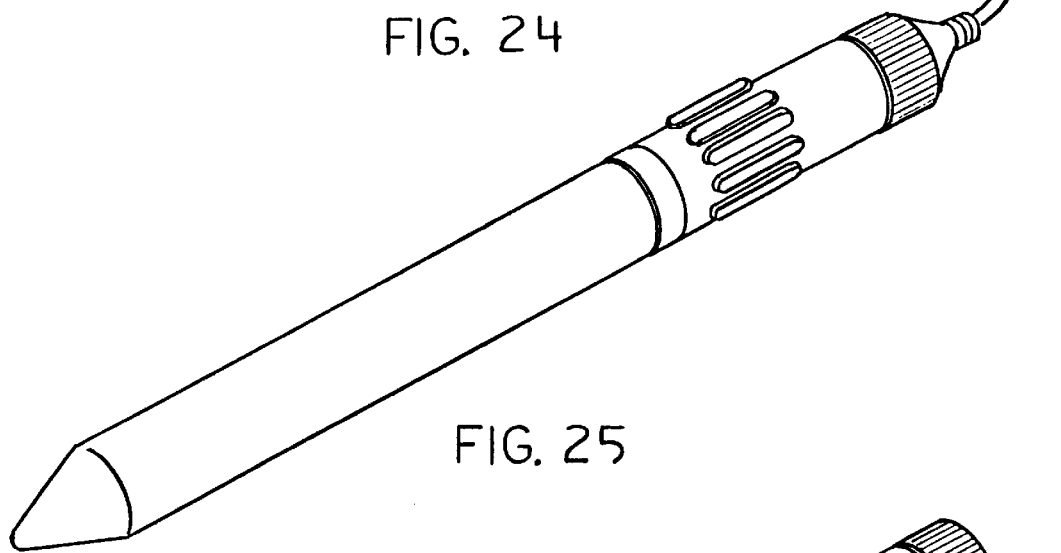
Figure 26:
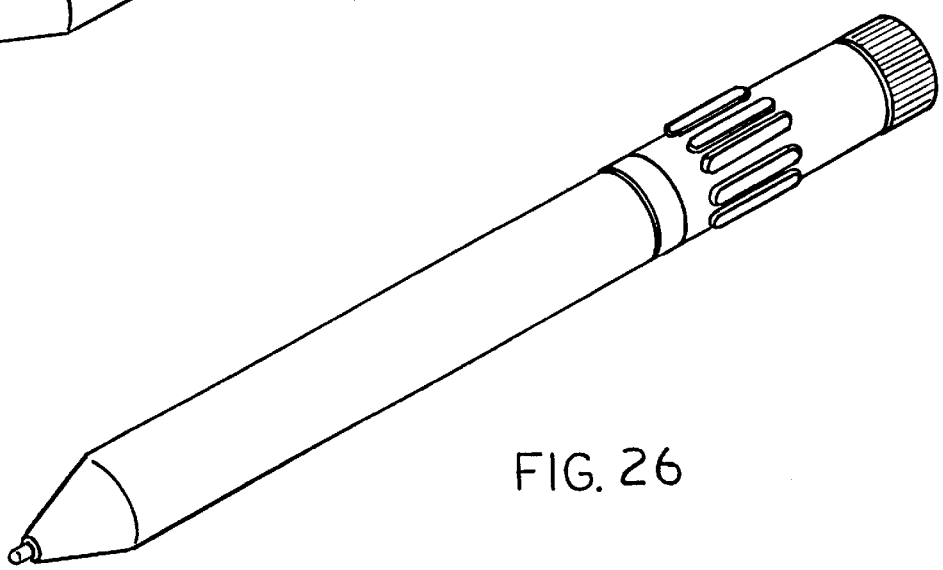

FIGS. 24, 25 and 26 depict a multicolored stylus system which is capable of reading information from a color display and providing multicolored screen writing capability. The stylus may be tethered to an electronic data system such as a data terminal or may be self contained and transmit data via a radio frequency link. The stylus preferably includes active information gathering. Multiple selector switches are preferably provided around the circumference of the stylus to select which colors or range of colors are capable of being read. Preferably, the stylus system utilizes red, blue and green communicators with which the color information is extracted or sent by combining the output signals of RGB receptors. Alternatively, mode selection may be configured by rotating an outer portion of the stylus to varying positions. The stylus system may utilize triangulation to determine the position of the stylus relative to the display screen coordinates.

A passive stylus system provides self-contained battery powered electronics which may communicate its position to a receiving grid overlay on the display. Color information may be provided by a vibrating the tip of the stylus at varying frequencies, each frequency of vibration corresponding to a particular color.

Color stylus systems are especially applicable to pen-based computer systems having color displays. Possible applications may include a police officer using a portable data terminal to create an accident report wherein the path of each vehicle is traced in a unique color. Route drivers may user a specific color, red for example, to annotate damaged parcels. Having the stylus control the color information saves screen space on the display and eliminates the need for the user to venture through complex branching menu structures.

Description of FIGS. 27 Through 32

FIGS. 27 and 28 illustrate a mirror 210 for pivotal mounting (212) having a beam 214 with a magnetic deflection pad 216 and a pair of opposing magnetic drivers 218, 220 for controlling the path of a monochromatic light source (not shown) for use in a laser scanner or display. FIGS. 29 and 30 illustrate a two axis embodiment of the beam redirection device of FIGS. 27 and 28 device.

Figure 31:
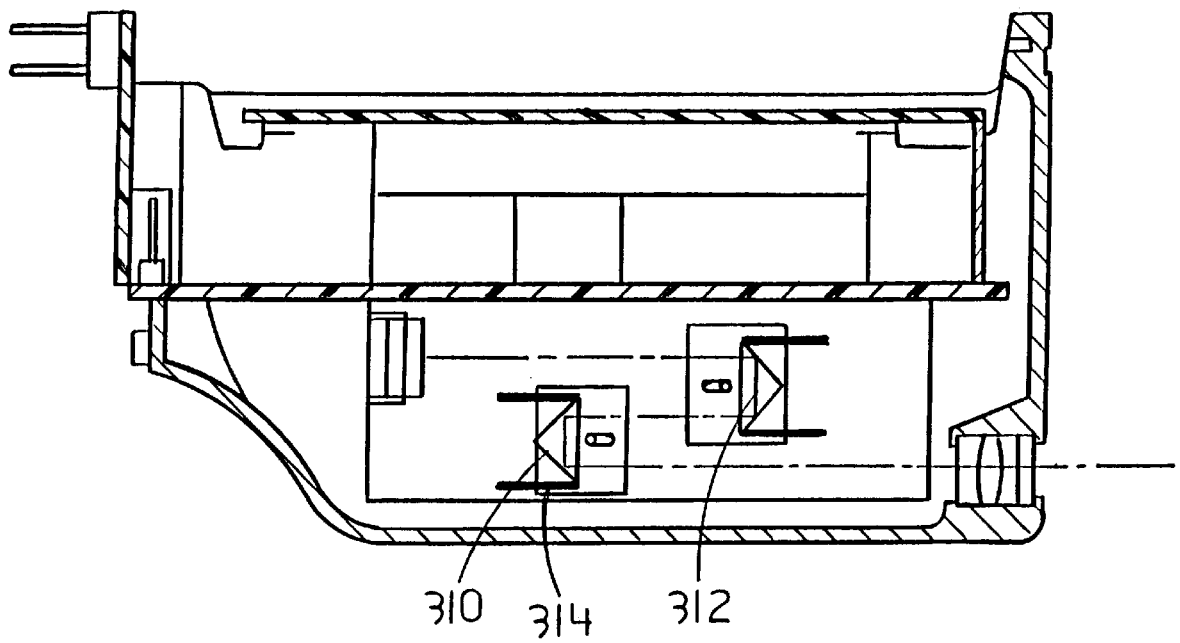
FIGS. 31 and 32 are side elevation views of a focusing system for a photosensitive array type optically readable information set reader according to the system of the present invention.
Figure 32:
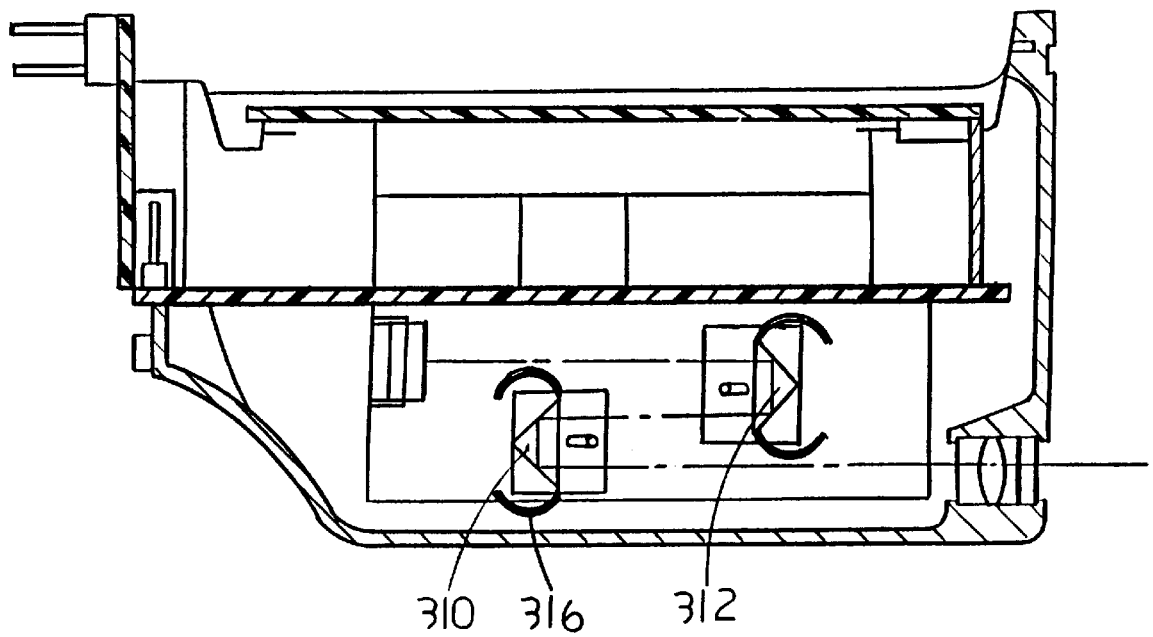

FIGS. 31 and 32 illustrate a focusing device for a long range photosensitive array based optically readable information set reader of the system of the present invention which utilizes piezo electric film motors to drive the position of prisms (310, 312) for altering the focal length of an optical string. The piezo electric film 314 (at rest) and with a voltage 316 is illustrated by FIGS. 31 and 32.

Voice Recognition Chip and Processor

The voice processor chip in combination with minimal parts (e.g., diode, resistor, capacitor, microphone, RAM chip and latch) may be assembled in a circuit which may decode up to 40 speech segments each being up to 0.90 seconds in duration. The RAM chip is utilized to store the template for each segment. Each utterance initiates a dictionary lookup. The chip provides a good measure of speaker independence. Thus the voice processor chip may be utilized in the present invention to provide hands-free operation and control of the disintegrated terminal.

Figure 33:
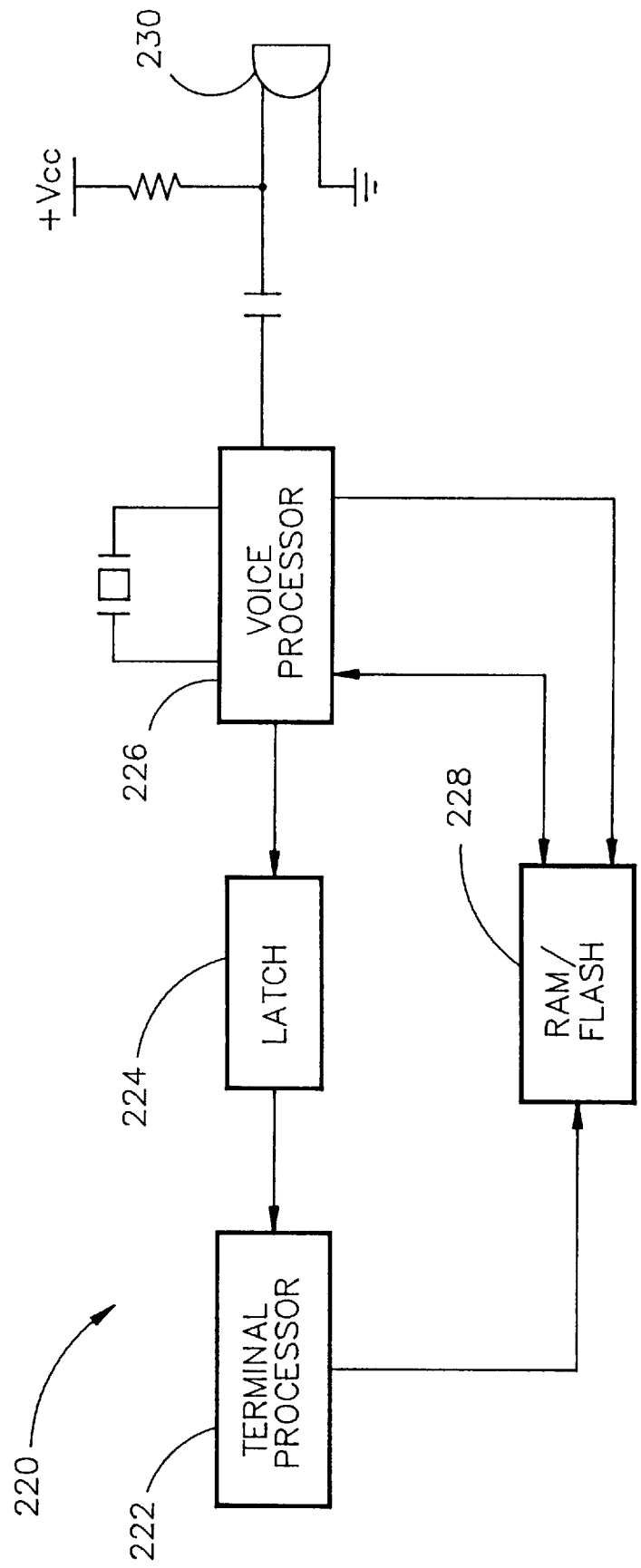
FIGS. 33, 34 and 35 are schematic illustrations of a preferred embodiment of a speech recognition system utilized in cooperation with the data collection and processing terminal of the present invention.

It may be desired to provide a larger than 40 word vocabulary. The voice chip may be utilized as a coprocessor within the terminal. Instead of a simple, static RAM, the RAM may be flash memory (rewritable ROM). The terminal may then be retrained for a particular user or application and the results stored in the flash memory. The RAM or flash may be configured as dual port RAM, and the main terminal processor may write the templates to memory to match the user requirements. One key phrase, for example, may be used to select an alternate dictionary. To enhance or to simulate speaker independence, different dictionaries or template sets could be provided by using the operator's name, for example, as a keyword for selection. Each operator could then have his own dictionary of appropriate customized phrases. One way to accomplish this would be to use the legal accessible memory space for this chip. The high order address lines then could select the appropriate memory bank. These lines could be latched by the main terminal processor in response to key words. This is shown schematically in FIG. 33. A voice processor circuit 220 may comprise a terminal processor 222, latch 224, voice processor 226, RAM or FLASH memory 228 and a microphone 230. In a typical scenario, the terminal processor would set all high order bits to zero to select the first bank of memory. The user would speak his name into the microphone. Data would be latched by the voice processor. Reading the latched data, the terminal processor would recognize the name as a key word. The terminal processor would then select the corresponding set of phrase templates by adjusting the value of the high order address lines. The name "Betty" may access bank 1011 or hexadecimal B. Operating within this bank, she may jump to other sets of phrases with other key words. She may use the word "back" to get back to the power-up memory bank. She may, for example, use the word "input" to get into a data input vocabulary or the word "query" to do data queries in an inventory database. The size of the allowable accessible memory, in one sense is a limitation. The forty word limitation enhances the speed of the look-up process. Smaller sized dictionaries require less processing time.

Figure 34:
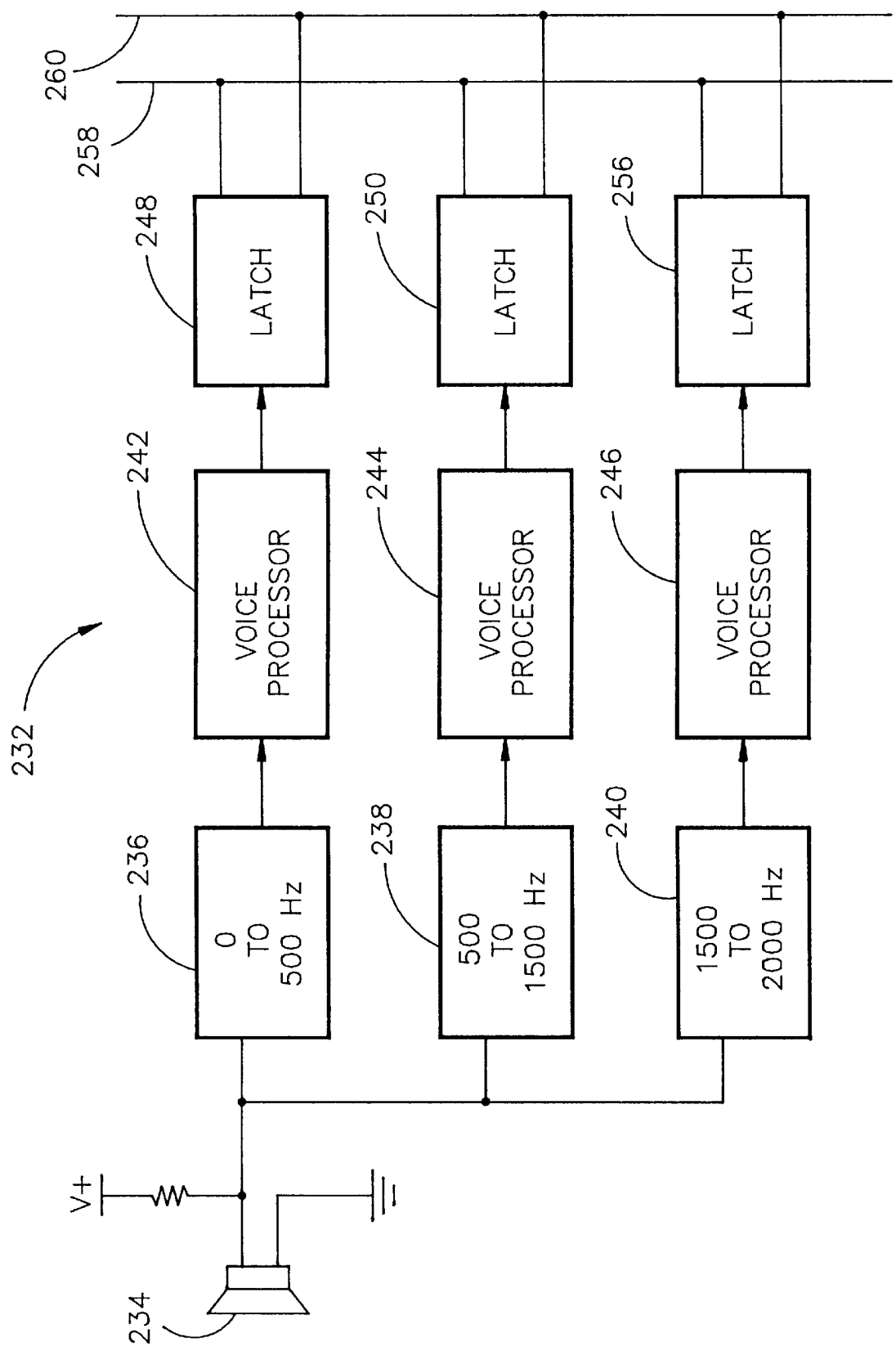

Certain implementations of such systems may be troubled by ambient noise problems. Several approaches may improve performance in these environments. It may be possible to segment the spectrum and run three of these speech recognition chips in parallel as shown in FIG. 34. The spectrally divided voice processing circuit 232 may comprise microphone 234, filters 236, 238 and 240, voice processors 242, 244 and 246, latches 248, 250 and 256, data bus 258 and control line 260. As an example, data coming into the first processor could be low pass filtered to cut out frequencies above 500 Hz. Data being fed from the microphone into the second processor could be bandpass filtered between 500 and 1500 Hz. The third processor would see high pass filtered input in the range of 1500 to 3000 Hz. Each of the three processors would have its own set of utterance templates for its specific frequency range and would operate independently in parallel. Data from the latches could be compared in a voting arbitration process. A matching pair of data beats the odd word. Any decipherable word beats and indecipherable pair. Inconclusive results may be arbitrated by the user. Incorrect results may be repairable by the operator who could potentially use the word "erase" or "delete."

It may appear inappropriate to utilize three chips with the same function in a single circuit. However, these chips are available as dies and would take up very little space on a circuit board or flex circuit. Either type circuit may be utilized within a PC-CARD (a.k.a. PCMCIA card) enclosure. In this way, any terminal product with a PC-CARD interface could support this type of input and output device. A schematic of this type of circuit is shown in FIG. 34. Memory chips are not shown in the circuit. Each latch communicates with the bus independently and is selected through the control lines.

Figure 35:
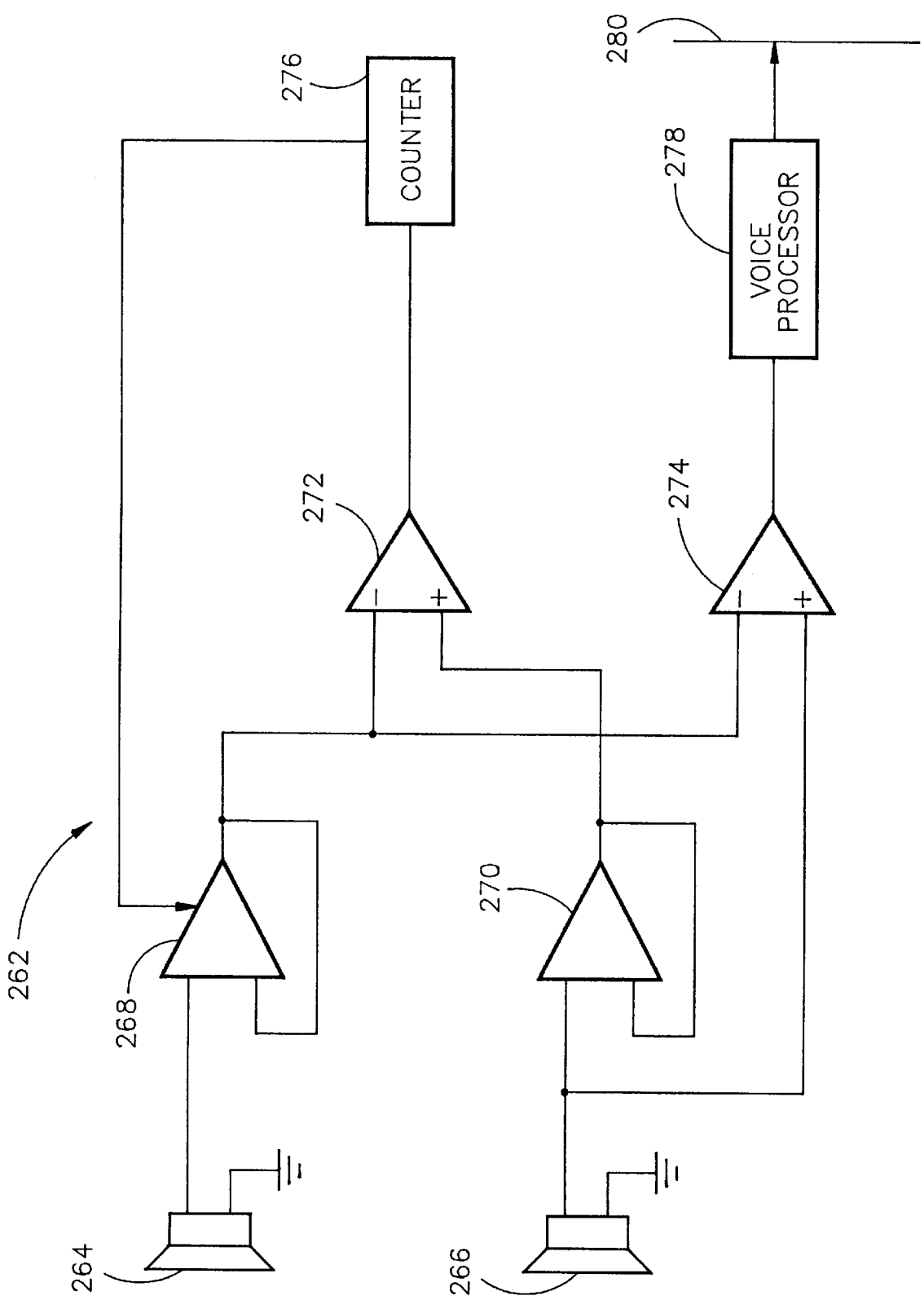

Another method to accomplish a measure of noise tolerance is to incorporate two microphones into the system and subtract the output of one from the output of the other. In this manner, the ambient noise, after being suitably amplified, functions as a correction signal for the other microphone. In the PC-CARD configuration, one small electret microphone could be built into the card assembly itself. In order to generate the correction signal in the two microphone system, both microphones need to be closely matched. The correction signal from the microphone could be fed into a programmable gain amplifier. The gain could be controlled by the value of the sum of the two signals as fed through a differential amplifier as shown in FIG. 35. The noise cancellation circuit 262 may comprise a pair of microphones 264 and 266 a pair of buffer amplifiers 268 and 270, a pair of differential input amplifiers 272 and 274, a counter 276, a voice processor 278, and a data bus 280. The input signals are continuously compared and their difference controls the direction in which the free running counter counts. If the first microphone has more output than the second microphone, then the counter runs backwards. The first buffer is a programmable gain amplifier that accepts parallel data to set the gain. This parallel data is provided by the counter. Thus, the buffer output is dynamically adjusted until the counter oscillates across a single value. At this point the gain is correctly adjusted. Any utterance then stands out in stark contrast to the auto-nulled output. Speech is sensed by only one microphone. Using capacitive elements, the response may be set to accept voice input. Using filters to spectrally decompose the input signal is a low level means of accomplishing course Fourier analysis in a linear fashion.

It is highly advantageous to utilize voice recognition as an input device for a terminal. Keyboards and pen input devices are not suitable for "hands-free" operation. There is no contact abrasion in a voice input device. There are no moving parts since it is not an electromechanical device. The concept of switch life is no longer relevant. A voice processing interface provides an augmented PC-CARD capable terminal. Further, foam noise reduction and cancellation devices and microphone head mounts could be used. The voice recognition interface provides a complementary relationship to the disintegrated computer terminal of the present invention to provide full "hands-free" operation.

Pen input character recognition technology has not to date been perfected and presents a greater technological challenge than speech recognition. The data in character recognition tends to appear as a two-dimensional array of data. Position of data in two-dimensional space and relative orientation are difficult problems to overcome. Voice is distributed as a vector of data. Operations upon this data may be performed more easily than in the case of two-dimensional data operations of character recognition.

What is claimed:

1. A data collection system, comprising:
   (a) at least one at least partially wearable data collection terminal, said data collection terminal having at least one microcomputer with associated memory, a power supply, at least one input and at least one output, a communication link, voice recognition means, and a display;
   (b) at least one user position and next task location device associated with and in operable communication with at least one of said data collection terminals;
   (c) at least one data collection peripheral in operable communication with at least one of said data collection terminal and said user position and next task location device;
   (d) at least one data processing host in operable communication with at least one of said user position and next task location device such that data collected via a data collection terminal may be communicated to said host via at least one of said user position and next task location device.

2. The data collection system of claim 1 wherein said partially wearable data collection terminal further comprises a mass data storage device capable of operably storing at least a partial days data collection.

3. The data collection system of claim 1 wherein said at least one power supply is generally shaped so as to conform to a portion of a user's body.

4. The data collection system of claim 1 wherein said display is a field emission display.

5. The data collection system of claim 1 wherein said wearable data collection terminal includes a voice system interface wherein operation of said wearable data collection terminal is implemented through voice commands.

6. The data collection system of claim 1 wherein said microcomputer with associated memory and input and output are on a single feature card.

7. The data collection system of claim 1 wherein at least one of said data collection peripheral is a trackpad.

8. The data collection system of claim 1 wherein at least one of said data collection peripherals is a touch-panel.

9. The data collection system of claim 1 wherein at least one of said data collection peripherals is a keyboard.

10. The data collection of claim 1 wherein said power supply may be operably interconnected with additional power supplies such that said interconnected power supplies may be utilized in sequence.

11. The data collection system of claim 10 wherein said interconnected power supplies may be pivoted with respect to each other along at least one axis.

12. The data collection system of claim 1 wherein said user position and next task location device includes a global positioning system.

13. The data collection system of claim 12 wherein said device includes a display for graphically displaying user location and next task location information.

14. The data collection system of claim 1 wherein at least one of said data collection peripherals is an optically readable character set reader.

15. The data collection system of claim 14 wherein said reader is a laser scanner.

16. The data collection system of claim 15 wherein said scanner utilizes a beam deflector having a mirror mounted on a shaft and hub rotatably driven within a bearing by a coil against a resilient shaft.

17. The data collection system of claim 1 wherein said voice recognition means includes a microphone and associated voice recognition hardware and software.

18. The data collection system of claim 17 wherein said voice recognition means is capable of recognizing a set of data gathering commands.

19. The data collection system of claim 18 wherein said voice recognition microphone is mounted on a user wearable headset.

20. The data collection system of claim 19 wherein said display is a headset mounted personal display.

* * * * *